United States Patent [19]

James

[11] Patent Number: 5,717,868
[45] Date of Patent: Feb. 10, 1998

[54] ELECTRONIC PAYMENT INTERCHANGE CONCENTRATOR

[75] Inventor: David L. James, Dublin, Ohio

[73] Assignee: Huntington Bancshares Inc., Columbus, Ohio

[21] Appl. No.: 399,763

[22] Filed: Mar. 7, 1995

[51] Int. Cl.⁶ .................................................. G06F 17/60
[52] U.S. Cl. ............................................ 395/235; 395/239
[58] Field of Search .............................. 364/401 R, 404, 364/405, 406, 407, 408; 395/201, 235, 237, 239, 240, 242, 243, 244

[56] References Cited

U.S. PATENT DOCUMENTS

| | | | |
|---|---|---|---|
| 4,742,457 | 5/1988 | Leon et al. | 364/408 |
| 4,972,463 | 11/1990 | Danielson et al. | 364/408 |
| 5,050,078 | 9/1991 | Sansone | 364/406 |
| 5,237,500 | 8/1993 | Perg et al. | 364/408 |
| 5,265,007 | 11/1993 | Barnhard, Jr. et al. | 364/408 |
| 5,526,409 | 6/1996 | Conrow et al. | 364/401 |

*Primary Examiner*—James P. Trammell
*Attorney, Agent, or Firm*—Porter, Wright, Morris & Arthur

[57] ABSTRACT

An apparatus, system and process for effecting one or more of the reception, transmission, translation and storage of data files containing information relating to financial instruments among and between multiple institutions wherein a data file in a first file format is received from an originating institution, the file is translated into a second data file format selected by an institution that is to receive the information, the information is stored in memory which is uniquely accessible to the receiving institution and transmitted to the receiving institution. Information derived from the financial instrument information contained in the second data file format may be transmitted to a settlement mechanism. The transmission to the receiving institution and to a settlement mechanism may occur on demand, based on instructions by the originating institution and within a prearranged time period.

91 Claims, 2 Drawing Sheets

ELECTRONIC PAYMENT INTERCHANGE CONCENTRATOR

FIELD OF THE INVENTION

The present invention relates to the processing of financial instruments among banks and similar institutions. More particularly, the present invention provides a means for translating dissimilar data file formats containing financial instrument information between participating financial institutions. The information is received from an originating institution in one of a plurality of industry data file formats, translated to a data file format selected by the institution that is to receive the information, and transmitted to the receiving institution. Thus, a turn-key system is provided allowing multilateral exchanges between and among a plurality of institutions having different transmitting and receiving formats.

DESCRIPTION OF RELATED ART

In the prior art, to effect the clearing and/or transfer and settlement of financial instruments such as a check, financial institutions must either typically transport the instrument to the payor's bank physically or submit the instrument into a settlement clearing system, local clearing houses or more sophisticated national clearing houses such as that described in the present assignee's U.S. Pat. No. 5,265,007. A bank, which has received an instrument on behalf of a payee (bank of first deposit), presents the instrument either directly to the drawer's bank for payment or introduces the instrument into a mechanism in the appropriate payment system. Bilateral or multi-party agreements are entered into between each bank of first deposit and each payor bank in order to facilitate settlement between and among the participants. Delays in check processing, transportation, settlement and subsequent availability of funds are frequently associated with conventional processing. Alternatively, electronic settlement and presentment is faster; however, certain obstacles must be overcome to enable electronic settlement between or among participating institutions, namely the installation of requisite and costly hardware and software systems to facilitate associated electronic transmissions.

Financial institutions which exchange financial instrument information electronically must communicate data in the same data file formats. Several distinct formats are currently used to process financial instrument transactions, such as payment of checks, electronically. An originating institution in receipt of a check deposited by a customer transmits data derived from Magnetic Ink Character Recognition (MICR) line codes from the check, including the check amount, account number, serial number and routing transit number, and/or other information, in one of several standardized formats. If the format required by the receiving (payor) institution is different, dedicated software is required to translate the originator's file into a format readable by the receiving institution. If this is the case, substantial monetary investment is required to provide both hardware and software capabilities at the originating and/or receiving institution to allow the exchange of electronic check data if different data formats are involved with respect to the receiving or originating institutions. Usually, institutions using different formats do not communicate on a bilateral basis.

By way of example, a first depository bank (customarily the payee's bank) in receipt of a check from one of its customers may desire to send electronic data files in a standard electronic format such as the Federal Reserve's Electronic Cash Letter (ECL) format to the drawer's bank (i.e., the payor bank). However, if the payor bank upon which the check is drawn is capable only of receiving data files in the Automated Clearing House (ACH) format, the two institutions are incapable of exchanging check MICR line data and engaging in bilateral settlements. When either the payee or payor bank is a small institution or an institution that otherwise does not process a high volume of checks, these institutions cannot attain the efficiencies of speed and funds availability associated with bilateral electronic exchanges. A substantial software investment is necessary in this instance. If a bank did invest to provide this capability, the increased costs associated with recoupment of the investment would increase operational costs, a commercial undesirability.

OBJECTS OF THE INVENTION

Accordingly, it is an object of the present invention to enable the exchange of financial instrument information between and among multiple institutions for processing when the data file formats utilized by the institutions are dissimilar.

It is also an object of the present invention to provide a system which simplifies and expedites the electronic exchange of financial instrument information between a plurality of institutions.

Another object of the present invention is to provide a system which allows financial institutions to receive information representing various financial instruments from multiple institutions originating in a variety of standard data file formats, but received by a receiving institution in a selected format determined by the receiving institution.

An object of the present invention is to provide a system which receives information representing financial instruments in a first data file format from a financial institution and translates the data into a format acceptable to one or more of a plurality of settlement mechanisms.

Another object of the present invention is to provide a system which allows financial institutions to receive information, derived from financial instruments, from multiple institutions originating in a variety of standard data file formats, but received by a receiving institution in a selected format determined by the receiving institution.

Another object of the present invention is to provide a system which allows financial institutions to receive information, derived from financial instruments, from multiple institutions originating in a variety of standard data file formats, and transmitted to one or more of a plurality of settlement mechanisms in a format acceptable to each mechanism.

It is a further object of this invention to provide a system which allows financial institutions to receive electronic information representing check MICR line and/or other data, or data representing an electronic funds transfer, from multiple institutions originating in a variety of standard data formats, but received by a receiving institution in a selected format determined by the receiving institution.

Another object of the present invention is to provide a system which receives check MICR line and/or other or additional data in a first data file format from a financial institution and translates the data into a format acceptable to one or more of a plurality of settlement mechanisms.

Another object of the invention is to provide a permanent memory storage device which archives financial instrument information exchanged between originating and receiving institutions.

An object of the present invention is to provide a system which allows an originating institution to transmit a data file containing information representing a plurality of financial instruments to be exchanged between the originating institution and one or more receiving institutions, separating and translating the first data file into one or more data files and data file formats corresponding to each of the designated receiving institutions, and transmitting the separated and translated data files to each of the receiving institutions.

A still further object of the present invention is to provide an integrated system which allows financial institutions to receive electronic information representing financial instruments from a plurality of institutions originating in a variety of standard data formats, translating the information into a second data format selected by the receiving institution, storing the second data format and information contained therein in a memory storage address uniquely accessible to a specific receiving institution, providing a means for a receiving institution to access such stored data, transmitting the data to the receiving institution, and providing an archival memory storage device. An integrated system is provided which allows financial institutions to receive financial instrument information in a data file from multiple institutions originating in a variety of standard data formats. The information is translated into a data format selected by the institution that is to receive the information and the financial instrument information is transmitted to one or more of a plurality of settlement mechanisms.

The present invention also provides a process which allows institutions to receive financial instrument information from multiple institutions originating in a variety of data formats, to translate the data into a format specified by the institution that is to receive the information, to store the information contained in the data file in a memory storage address uniquely accessible to a specific receiving institution, to provide a means for the receiving institution to access the stored data, and to transmit same to the receiving institution.

It is yet another object of the present invention to avoid strict timing requirements in that both originating and receiving institutions are provided an ability to unilaterally determine the timing of sending and/or receiving financial instrument information within the system rather than be bound by a strict schedule.

SUMMARY OF THE INVENTION

The foregoing objectives are achieved in an electronic payment interchange concentrator system for effecting one or more of the reception, transmission, translation and storage of data files containing information relating to financial instruments among and between multiple institutions. The invention includes a means for receiving a data file from an originating institution. The data file is in a first file format established by the originating institution and contains a designation that the information in the data file is to be received by a predetermined institution or institutions. The data file may contain co-mingled financial instrument information, portions of which are intended for one or more of a multiple of receiving institutions or settlement mechanisms. A processor translates the financial instrument information in the first data file format into a second data file format selected by each institution that is to receive the information. Also included is a means for storing the financial instrument information in the second data file format in memory which is uniquely accessible to each institution that is to receive the information. The system also includes a means for transmitting the financial instrument information in the second data file format to the institution that is to receive the information upon one of demand from the receiving institution, instructions by the originating institution and within a prearranged time period.

These and further objectives will become apparent from the following description.

DETAILED DESCRIPTION OF THE PREFERRED EMBODIMENT(S)

Figure 1:
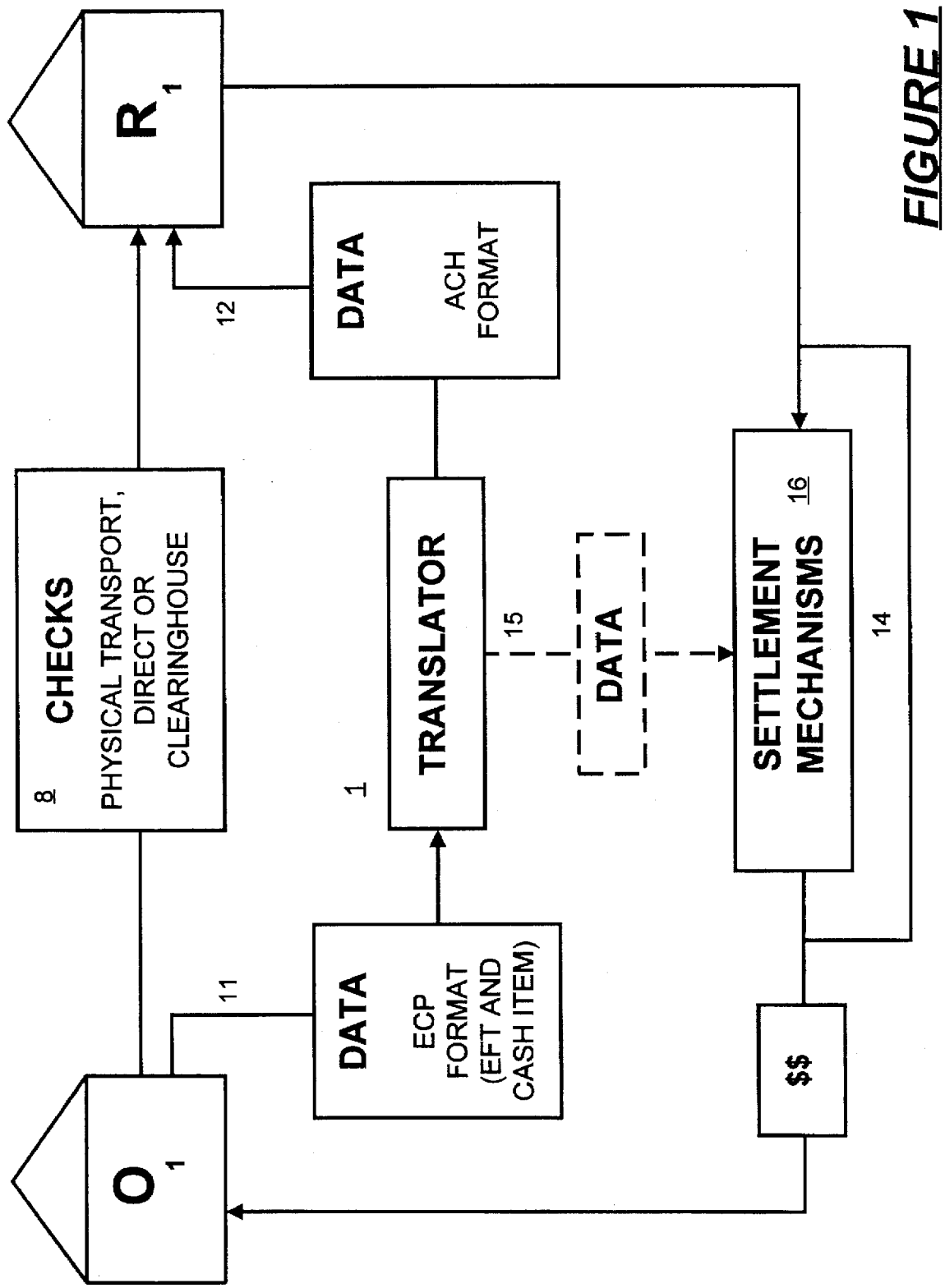
FIG. 1 is a simplified illustration showing a data file format translator in a bilateral relationship of two clearing banks with regard to an instrument presented for payment, and one or more possible settlement mechanisms.

A system is provided that expedites the processing of financial instrument information by (1) receiving an electronic data file containing financial instrument information from an originating institution; (2) translating the data file format received from the originating institution into a format established by the institution that is to receive the information; (3) transmitting the reformatted data file to the receiving institution; and (4) providing an archival facility to store the financial instrument information. In contrast with bilateral translation systems, the invention provides for the exchange of information among multiple institutions in different formats in a system which is adapted to deliver translated files in differing formats to different receiving institutions, and further to include in the files additional information that is useful in the settlement and reconciliation of exchanged information. The present invention also communicates with existing clearing and settlement mechanisms to expedite the clearing of the financial instruments represented by the information in the data file and the settlement of funds represented by the financial instruments.

The electronic payment interchange concentrator, EPIC, allows financial institutions to receive electronic information such as usually associated with categories appearing in check MICR line data, representing financial instruments and electronic funds transfers, and additional system generated information such as trace number, bank of first deposit, account deposited to, and the like, from a variety of sources originating in a plurality of industry data file formats. EPIC translates the information sent by the originating institution(s) into a format selected by the receiving institution. EPIC provides individual memory storage for each receiving institution which allows retrieval of financial instrument information on a timely basis by the receiving institution according to clearing requirements or options determined by the institution.

Many financial institutions are now capable of transmitting and receiving data files, however they are not usually capable of exchanging data files in a plurality of different file formats associated with other institutions. As a result of the present invention, institutions can exchange financial instrument information notwithstanding that neither institution has the capability with regard to an exchange of information to process that information in the data file format in which it is received. The present invention is a turn-key system that allows institutions to utilize existing sending and receiving systems to communicate with multiple financial institutions and/or settlement mechanisms having different file format protocols without changing or investing in new software and hardware systems. The system reduces the complexities of timing and technical arrangements usually involved in bilateral and multilateral exchanges.

References herein to financial instrument information contained in a data file are intended to encompass physical items such as checks, paper cash items, money orders, share orders, drafts and other physical instruments as well as electronic funds transfers. Hence, the term "check" is also intended to include these items. Moreover, the Federal Reserve System's standard definition of a "cash item" is incorporated by reference herein.

FIG. 1 illustrates originating institution O1 and a translator 1. A communication link 11 is established between the originating institution's central processing unit (CPU) (not shown) that maintains electronic data files of financial instruments processed at the originating institution and sent to the translator. The link facilitates the transfer of data files containing financial instrument information. Translator 1 receives the data file which contains information relating to financial instrument information to be exchanged between originating institution O1 and a receiving institution R1.

The data file received by the translator is arranged in a first format. Conventionally, data file transmission is based on a file structure and format. The file structure comprises a plurality of header, detail and trailer records. Each record contains data fields having a unique address wherein a character or number is stored. The file format specifies the arrangement of information within individual data fields or ranges of data fields within a particular record. For example, data fields 1 through 30 in a header record may contain the name of the originating institution. Similarly, data fields 1 through 20 in the first detail record may contain the amount (e.g., the dollar value) of the financial instrument being exchanged. As a result, a receiving institution, if unable to process the particular format utilized by the originating institution is incapable of receiving information or of receiving that information accurately.

In the United States banking industry, several data file formats are used to transfer financial information between and among institutions and settlement mechanisms. By way of example, among the common formats are: Electronic Check Presentment (ECP), Automated Clearing House (ACH), and Electronic Cash Letter (ECL). Although standardized, these formats are incompatible with one another. Consequently, an originating institution may have a singular capability to transfer data in a first file format. However, if a financial institution which is to receive this information does not have processing capabilities compatible with this format, the originating and receiving institutions are incapable of communicating with regard to information contained in the data files.

The present invention resolves this problem. The system validates identifying information contained in the data file with respect to the originating institution and the receiving institution designated by the originating institution to insure that both are system participants. The identifying information ensures: (a) the originating institution is authorized to access the system; (b) the intended receiving institution is recognized by the system; and (c) the receiving institution's selected data file format is one which the system acknowledges.

A processor, within translator 1, employing data processing and signal generation procedures, translates the first data file format received from originating institution O1 into a second data file format selected by the institution that is the intended recipient of the financial instrument information R1. Security procedures are utilized to limit only authorized originating and receiving institutions to effect one or more of the reception, transmission, translation and storage of the financial instrument information contained in the data file. Procedures are also used to authenticate information contained in the first data file format with respect to predetermined data format parameters. This includes validating that the data file submitted by the originating institution is in a format which the system recognizes; that the data fields with respect to items in the file are accurate according to format parameters; and that the minimum amount of information required to successfully translate the file is present whether the information is to be transmitted to a receiving institution or to one or more settlement mechanisms. (Some formats have optional fields that are not "necessary" for the purposes herein.)

In the preferred embodiment, the receiving institution determines the data file format in which it desires to receive the financial instrument information. (As explained above, a specific data file format has associated with it a particular arrangement of information within individual data fields dependent upon the format utilized (ACH, ECP, etc.)). The information contained in the data file is authenticated to ensure that the data arrangement corresponds to the parameters associated with the format utilized.

In the simplified example of FIG. 1, originating institution O1, a bank of deposit of a financial instrument, transfers a data file containing information about that instrument in the ECP data file format to translator 1 through communication link 11 and specifies receiving institution RI as the intended recipient thereof. The receiving institution's selected data file format is ACH. The translator receives the first data file format (ECP), recognizes that R1 is the receiving institution and that R1 has selected a second data file format (ACH) in which it is capable of receiving information. Using a logical sequence of data interpretation and signal generation steps, translator 1 translates the ECP information from O1 into the ACH format to be received by R1 by way of the communication link 12 between the translator and R1. The paper check is presented to R1 by direct physical transport or clearinghouse mechanism 8 from O1. The processing of the funds representing the physical instrument may be effected by way of settlement mechanism 16, to which the translated data is also sent, as shown by the dashed lines 15 in FIG. 1. The funds represented by the physical instrument may also be exchanged between originating institution O1 and R1 directly as illustrated by path 14.

In a multiple institution application, a single data file transferred by an originating institution to the translator in a first file format may contain co-mingled financial instrument information intended for multiple receiving institutions. The single data file includes separate and unique header records for instruments associated with each receiving institution. Upon receipt of this data file, the system determines which financial instrument information is intended for a receiving institution and translates that information to a different format selected by that particular receiving institution. In this manner, an originating institution can transfer one data file containing information intended for a plurality of receiving institutions. The system translates and compiles the information consistent with the second data file format selected by each receiving institution.

A memory storage mechanism that is uniquely accessible to a particular receiving institution is included in the system. An institution may receive several files representing financial instrument information from many originating institutions at different times during a typical business day. The receiving institution, however, may not need access to this information at the particular time it is sent and translated into the second data file format. According, the information is stored in memory allocated exclusively to that particular receiving institution enabling it to retrieve the financial instrument information upon demand, at a predetermined time, based on instructions submitted by the originating institution, or within a prearranged time period. Storage devices such as magnetic tape, CD ROM, or other readable means may also permanently store the financial instrument information for archival or audit purposes.

Having translated and processed the data file formats, the system is also capable of transmitting the information contained within the files to one or more of a plurality of mechanisms for settlement purposes. This transfer to a settlement mechanism may be based on instructions from either the originating institution O1 or receiving institution R1. The receiving or originating institution has the capability to designate a preferred settlement mechanism through which to settle funds represented by the financial instruments as a standard procedure. A typical settlement mechanism or check clearing system accessible from EPIC is described in U.S. Pat. No. 5,265,007, Barnhard, et al. (The assignee of this patent is also the assignee of the present invention). This feature facilitates the expedited settlement and clearing of funds represented by the information contained in the data files between originating and receiving institutions.

Figure 2:
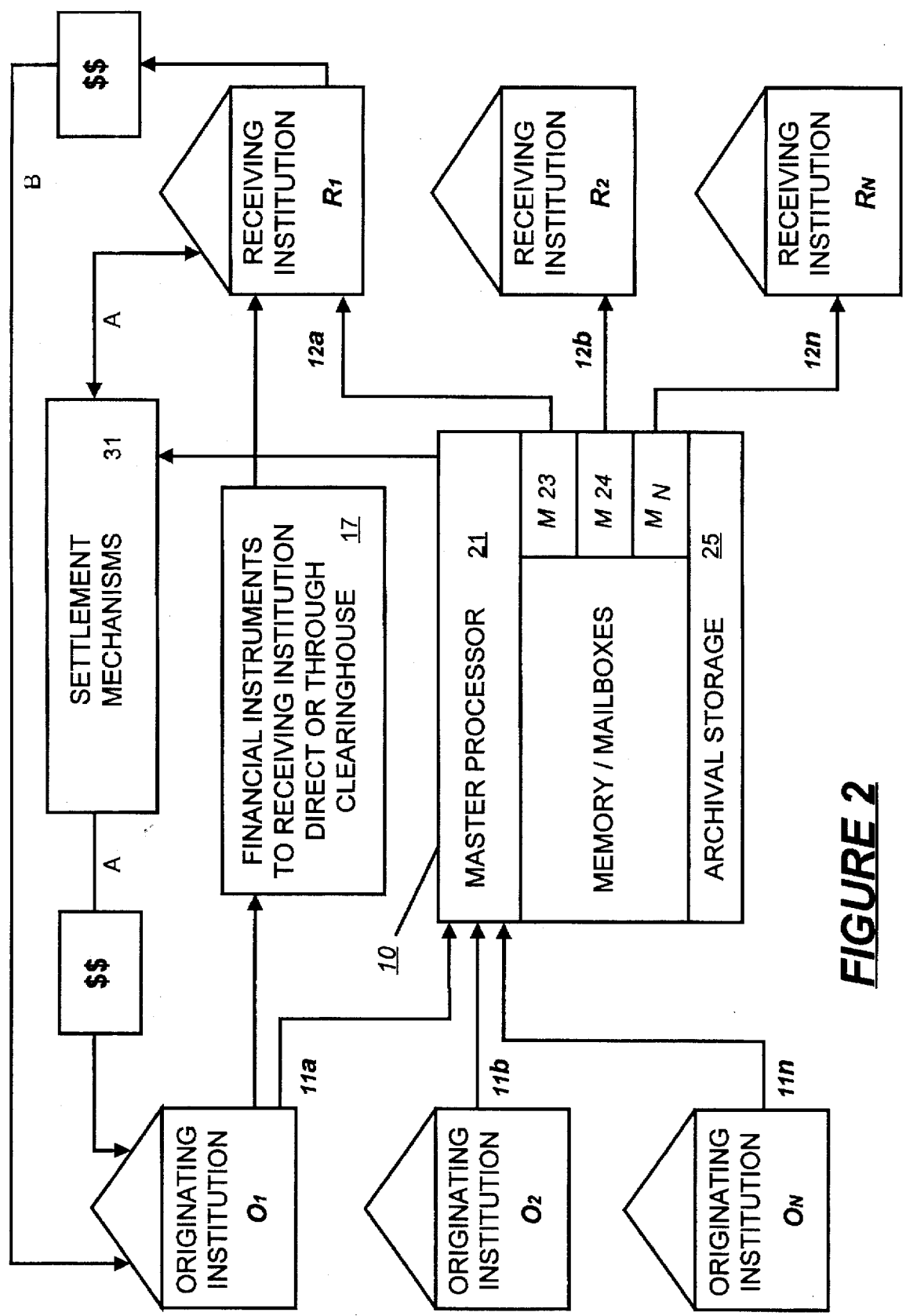
FIG. 2 illustrates multiple participating financial institutions; the electronic payment interchange concentrator ("EPIC"); the translation of a data file containing financial instrument information from a first file format established by an originating institution to a second file format established by a receiving institution; a memory storage area within EPIC accessible to a specific originating and/or receiving institution; the transmission of the second file format to the receiving institution; the optional transmission of information to a settlement mechanism; and an archival mechanism for permanently storing the financial instrument information.

The present invention thus includes a system for effecting one or more of the reception, transmission, translation and storage of data files containing financial instrument information between and among multiple institutions. The system is illustrated, by way of example, in FIG. 2 in which originating institutions, or the banks of first deposit, O1, O2 . . . ON are in receipt of numerous checks from their customers or other institutions drawn on different receiving institutions (payor banks) R1, R2 . . . RN. In the prior art, the bank of first deposit would physically prepare a cash letter representing the physical checks 17 and their respective amounts drawn on each of banks R1, R2 . . . RN, physically deliver and present the checks directly to the payor banks or through clearinghouse 17. Funds represented by the checks are settled from the receiving institution by way of settlement mechanism 31, as referenced by path A, and/or directly from the receiving institution to the originating institution as referenced by path B.

Alternatively, if the banks of first deposit O1, O2 . . . ON and payor banks R1, R2 . . . RN communicate using the same data file format, then the banks of first deposit may prepare a data file containing financial instrument information in the common data file format, transmit the file to the appropriate institution and await settlement. Finally, if an automated settlement system is utilized and all the parties communicate using the same data file format, then the banks of first deposit O1, O2 . . . ON, and payor banks R1, R2 . . . RN communicate through the selected automated system. However, if the originating and receiving institutions or the originating institution and the settlement system do not utilize the same data file format, communication between and among them is impossible.

The present system enables the originating institutions O1, O2 . . . ON to transfer a data file in a first file format (ACH, ECL, etc.) containing financial instrument information to the system via communication links referenced generally at 11a, 11b, 11n. Security procedures are provided which limit only authorized originating and receiving institutions to effect one or more of the reception, transmission, translation and storage of the data files within the system. This ensures that the originating institutions O1, O2 . . . ON and the receiving institutions R1, R2 . . . RN are authorized to access the system, as well as preventing misappropriation of financial information contained in the data files by non-authorized parties. A further data validation protocol is provided to verify that the minimum amount of information to facilitate translation and transfer between the originating and receiving institutions, or from the originating and receiving institutions to one or more settlement mechanisms, is present in the data file. The system's master processor 21 identifies and segregates the information designated for each of the receiving institutions from each file received.

Based on the data file format selected by each receiving institution, master processor 21, according to a file format translation protocol, translates the data file received from each of the originating institutions O1, O2, . . . ON, into a second data file format selected by each of the receiving institutions R1, R2, . . . RN. The information contained in the data file which is intended for each receiving institution is stored in memory M23, M24 . . . MN uniquely allocated to each receiving institution R1, R2 . . . RN respectively. Such allocated memory can be provided in the system before or after the translation function. Most originating institutions maintain on site back-up of information transmitted. Communication links, referenced generally at 12a, 12b, 12n, enable each receiving institution to retrieve the information contained in the data files from memory M23, M24 . . . MN upon demand, based on instructions by the originating institution(s) or within a prearranged time period. The present system also includes communication link 30 for transmitting all or a portion of the information contained in the data file to one or more of a plurality of settlement mechanisms referenced generally at 31. Archival memory 25 is provided for audit purposes and preserves financial instrument information exchanged between originating and receiving institutions as well as information transmitted to settlement mechanisms. The communication links 11a, 11b, 11n and 12a, 12b, 12n are typically bi-directional to allow return transmissions such as confirmation of receipt and communication in general to and from the institutions and the system.

Each originating institution O1, O2 . . . ON transfers data files to the system which contain multiple header, detail, and trailer records for several receiving institutions R1, R2 . . . RN. This allows the originating institution to transfer a single file to EPIC and communicate with several receiving institutions utilizing multiple data file formats.

By way of example, originating institution O2 determines a first file format, such as ACH, in which it will transfer a single data file containing co-mingled financial instrument information to the system with the intended recipients as receiving institutions R1 and R2 which have selected to receive data files, for example, in the ECL and ECP formats respectively. The system segregates the received ACH information designated for each receiving institution; translates the segment of the ACH data file into the ECL format for receiving institution R1; translates the ACH segment of the data file into the ECP format for receiving institution R2; and stores each translated data file in separate memory categories M23 and M24 uniquely accessible by receiving institutions R1 and R2 respectively. The receiving institutions can retrieve information contained in the data files through communication links 12a and 12b upon demand, based on instructions by the originating institution or within a prearranged time period.

An originating institution may customize a sending file format(s) to include unique routing rules and to generate sender/receiver screen inputs for various settlement mechanisms. This information is contained within a specific record in an originating institution's data file. An originating institution may also determine acceptable file end points which satisfy predetermined receiver rules, direct storage of a file for retrieval, and allow access to screens displaying the status of files sent and received. Likewise, a receiving institution may customize its file formats to include unique sender rules that identify the sender and the format and/or category content of the file information being sent. The receiving institution may also sign on as a valid participant and acknowledge receipt of such files by transmitting a confirmation to the system and/or to a settlement mechanism. Typically, the data files exchanged between originating institutions, receiving institutions and EPIC include a file header record, a cash letter header record and a trailer record. The file header record may include one or more of an originating institution identification, a format key, date, time, rejection code and associated reason. Optimum operation of the system requires that minimum information be included in the cash letter header for all formats received. This information may include, among other information, originating institution identification, settlement instructions, a format key, date, time, a receiver key, trace block information, and cash letter identification information. If the format is improper, a rejection code, associated reason and other information may be generated. Less, more and/or other types of information may comprise the required cash letter header record.

On occasion, a financial instrument such as a check is returned to an institution of first deposit, usually a bank, based on insufficient funds in the drawer's account, forgery, stop payment, dishonor, or other reasons. The bank of first deposit may, in some situations, be the originating institution referenced herein. Presently, the physical instrument is needed to determine the account number of the payee at the institution of first deposit in order to reverse the credit of funds. This requires increased labor and processing costs.

The system solves this problem by providing an optional field in the appropriate data file detail record which records the account number of the payee at the bank of first deposit. Thus, in the data associated with this embodiment, the payor or receiving institution can quickly determine which account at the institution of first deposit should be reversed. Similarly, the account number of the payee at the institution of first deposit may also be transmitted to the selected settlement mechanism, thereby providing a means for timely reversal of funds. Accordingly, a detail record included in the data file may contain specific information including an originating bank identification, a bank of first deposit identification, and an account number associated with the bank of first deposit to which the funds were transferred. If a check is exchanged, the detail record also includes full MICR line information (separate fields), a sender bank trace number, a bank of first deposit trace number, an "also known as" (AKA) trace number, an image location, a physical document location, one or more filler fields, a return code, and a photo request code as this information is known in the industry. The cash letter trailer record may include an originating institution identification, a record count, a dollar hash total, and filler fields. The trailer file record includes total cash letter count, total detail record count, dollar hash totals, and filler fields.

Thus, the system described herein increases the number of institutions which can exchange financial instrument information and the speed of the exchange, while reducing the expense thereof, by providing a common central facility which translates information contained in a first data file format transferred by an originating institution into a second data file format selected by the institution that is to receive the information. Previously, institutions which desired to exchange financial instrument information among and between themselves were required to enter into multiple bilateral agreements between each participating institution and expend substantial development costs, including both software and hardware, to support creation of data files in multiple standard formats. Financial institutions which formerly could not exchange financial information which represented physical instruments and/or electronic funds transfers because of dissimilar data file format processing, are now capable of accessing a system which translates their present data file format into one or more standard formats.

In the system, a receiving institution is capable of receiving financial instrument information from an originating institution upon demand, based on instructions from the originating institution and within a prearranged time period. A means is also provided which reduces the need for obtaining the physical instrument when reversing a transfer of funds to/from an institution of first deposit.

Given the foregoing disclosure, it is evident that the benefits of the present invention may be extended and adapted to numerous types of commercial activities.

Although a specific embodiment of the invention has been described herein in detail, it is understood that variations may be made thereto by those skilled in the art without departing from the spirit of the invention or the scope of the appended claims.

What is claimed is:

1. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:

a means for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;

a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;

a means for storing said bundled financial instrument information in an addressable media where the bundled financial instrument information is uniquely accessible to the institution designated to receive the information;

means for the institution designed to receive the information to transmit to and to receive from the means for storing; and a means for transmitting a bundle of said stored financial instrument information from the addressable storage media to the institution designated to receive the information upon the receipt of an instruction.

2. The apparatus of claim 1 wherein said data file further contains identifying information with respect to the originating institution and the predetermined institution designated to receive one or more of the records in the data file, said apparatus further including means for:

(a) validating the identifying information of the originating institution and said designated receiving institution;

(b) authenticating the financial instrument information contained in said first data file format with respect to predetermined data format parameters; and (c) determining a data file format acceptable to the designated institution.

3. The apparatus of claim 1, further including a security mechanism for preventing the unauthorized one or more of the reception, transmission, translation and storage of financial instrument information.

4. The apparatus of claim 1 including a means for transmitting at least one portion of said bundled financial instrument information to one or more settlement mechanisms in a format acceptable to each of said one or more settlement mechanisms.

5. The apparatus of claim 4 in which the settlement mechanism is predetermined by the originating institution.

6. The apparatus of claim 4 in which the settlement mechanism is predetermined by the receiving institution.

7. The apparatus of claim 4 in which the settlement mechanism is predetermined by agreement of both the originating and receiving institutions.

8. The apparatus of claim 1 wherein said data file transmitted from said originating institution includes co-mingled financial instrument information intended for multiple receiving institutions.

9. The apparatus of claim 8 further including a means for separating said co-mingled financial instrument information corresponding to each of the multiple receiving institutions.

10. The apparatus of claim 9 wherein said processor translates said separated financial instrument information into one or more data file formats selected by each of the multiple receiving institutions.

11. The apparatus of claim 4 wherein said processor translates said at least one portion of said financial instrument information into one or more data file formats corresponding to a file format acceptable to each of said one or more settlement mechanisms.

12. The apparatus of claim 1 including an archive for storing one or more of the co-mingled financial instrument information and the bundled financial instrument information.

13. The apparatus of claim 1 wherein one or more separate portions of the bundled financial instrument information are transmitted to the designated receiving institution upon one of (a) demand from the receiving institution, (b) instructions by the originating institution and (c) within a prearranged time period.

14. The apparatus of claim 1 wherein the bundled financial instrument information includes identifying information with respect to an account at an institution of first deposit in which a financial instrument is deposited.

15. The apparatus of claim 14 in which the originating institution is the institution of first deposit.

16. The apparatus of claim 14 in which the originating institution is not the institution of first deposit.

17. The apparatus of claim 1 wherein at least one portion of the bundled financial instrument information comprises information with respect to settlement instructions from said originating institution.

18. The apparatus of claim 1 wherein at least one portion of the bundled financial instrument information comprises information with respect to settlement instructions from the receiving institution corresponding to said at least one portion.

19. The apparatus of claim 1 wherein detailed information concerning one or more cash item is associated with at least one portion of the bundled financial instruments.

20. The apparatus of claim 1 wherein at least one portion of the bundled financial instrument information corresponds to one of an electronic funds transfer and a paper instrument.

21. The apparatus of claim 20 wherein at least one portion of the bundled financial instrument information comprises information concerning one of a check, a money order, a share order, and a draft.

22. The apparatus of claim 1 wherein said financial instrument information includes detailed information derived from an MICR line.

23. The apparatus of claim 22 in which the information from the MICR line includes at least one of the routing transit numbers, customer account number and currency amount.

24. An electronic payment interchange concentrator for effecting one or more of the reception, transmission, translation and storage of data files containing information relating to financial instruments among multiple institutions, each of said data files containing identifying information with respect to an originating institution and multiple predetermined receiving institutions, said financial instrument information being exchanged between and among the institutions, comprising:

a means for receiving a data file from the originating institution, said data file being in a first file format established by the originating institution and comprising co-mingled financial instrument information intended for multiple receiving institutions, the data file further including a designation that specified information in the data file is to be received by a predetermined receiving institution;

a processor for: (a) validating the identifying information of the originating institution and each receiving institution; (b) authenticating the financial instrument information contained in said first data file with respect to predetermined data format parameters; (c) determining a data file format acceptable to each receiving institution; (d) separating said co-mingled financial instrument information into different portions associated with one or more of the multiple receiving institutions and (e) translating each portion of said separated financial instrument information in said first data file format into a data file format preselected by the receiving institution associated therewith;

a means for storing said separated financial instrument information according to the separate portions thereof in a memory storage device in a manner such that each separate portion is uniquely accessible to the receiving institution associated therewith;

a means for transmitting each portion of said separated financial instrument information stored in the memory storage device to, and in the format selected by, the receiving institution associated therewith; and an archive for storing one or more than one of the co-mingled financial instrument information and the separated financial instrument information.

25. The apparatus of claim 24 further including a means for transmitting at least one portion of said separated financial instrument information to a settlement mechanism predetermined by one of (a) the originating institution, (b) the receiving institution and by agreement of the originating and receiving institutions, the portion being transmitted to the settlement mechanism being translated into a data file format acceptable to said settlement mechanism.

26. The apparatus of claim 24 including a means for transmitting information, derived from at least one portion of said separated financial instrument information, to a settlement mechanism in a data file format predetermined by the receiving institution to be acceptable to the settlement mechanism.

27. The apparatus of claim 24, further including security procedures for preventing unauthorized reception, transmission, translation and storage of any financial instrument information.

28. The apparatus of claim 24 wherein said data file in said first file format transmitted from said originating institution includes co-mingled financial instrument information intended for multiple receiving institutions.

29. The apparatus of claim 28 further including a means for separating said co-mingled financial instrument information corresponding to each of the multiple receiving institutions.

30. The apparatus of claim 29 wherein said processor translates said separated financial instrument information into one or more data file formats selected by each of the multiple receiving institutions.

31. The apparatus of claim 25 wherein said processor translates said at least one portion of said separated financial instrument information into one or more data file formats acceptable to each of one or more settlement mechanisms to which the information is to be sent.

32. The apparatus of claim 24 wherein the financial instrument is one of electronic funds transfer and a paper instrument.

33. The apparatus of claim 24 wherein said data file transmitted from said originating institution includes financial instrument information intended for multiple receiving institutions.

34. The apparatus of claim 24 wherein at least one portion of the separated financial instrument information comprises information concerning each of one or more cash items.

35. The apparatus of claim 24 wherein at least one portion of the separated financial instrument information comprises a record of an electronic funds transfer or a paper instrument.

36. The apparatus of claim 35 wherein said paper instrument comprises one of a check, a money order, a share order, and a draft.

37. The apparatus of claim 34 wherein the information relating to the financial instrument is derived from an MICR line.

38. The apparatus of claim 37 in which the information from the MICR line includes at least one of the routing transit number, customer account number and currency amount.

39. The apparatus of claim 24 wherein said financial instrument information is a record of an instrument and further comprises identifying information with respect to an account at an institution of first deposit in which the financial instrument is deposited.

40. The apparatus of claim 39 wherein said institution of first deposit is said originating institution.

41. The apparatus of claim 39 wherein said originating institution is not the institution of first deposit.

42. The apparatus of claim 24 wherein at least one portion of the separated financial instrument information is associated with information with respect to settlement instructions from said originating institution.

43. The apparatus of claim 24 wherein at least one portion of the separated financial instrument information comprises information with respect to settlement instructions for the said at least one portion from the receiving institution.

44. The apparatus of claim 24 further including means for enabling the receiving institution to retrieve the separated financial instrument information associated with the receiving institution upon one of (a) demand from the receiving institution, (b) instructions by the originating institution and (c) within a prearranged time period.

45. A system for effecting one or more of the reception, transmission, translation and storage of data files between or among institutions, said data files containing co-mingled information about financial instruments, comprising:

a communication link between an originating institution and a master processor through which an electronic data file is sent from an originating institution, said data file being in a first file format established by the originating institution and containing identifying information with respect to both the originating institution and multiple institutions that are designated to receive different portions of the co-mingled financial instrument information;

said processor:
(a) validating the identifying information of the originating institution and the receiving institutions;
(b) authenticating the co-mingled financial instrument information contained in said data file in said first data format with respect to predetermined data format parameters;
(c) determining a preselected data file format acceptable to each receiving institution;
(d) separating said co-mingled financial instrument information into different bundles to be associated with a designated receiving institution; and
(e) translating each bundle of said separated financial instrument information into a data file format preselected by the receiving institution corresponding thereto;

a means for temporarily storing each bundle of said separated financial instrument information in memory unique to the receiving institution associated therewith;

a communication link for transmitting each bundle of said separated financial instrument information stored in the memory storage device to the receiving institution associated therewith; and an archive for storing one of said co-mingled financial instrument information and said bundles of financial instrument information.

46. The system of claim 45 wherein one or more bundles are addressed on behalf of the receiving institution for delivery into a settlement mechanism further including a communication link for transmitting information derived from at least one bundle of said separated financial instrument information to the settlement mechanism, said information being transmitted in a data file format acceptable to the settlement mechanism.

47. The system of claim 45 or claim 46 in which the bundles are associated With an address for the receiving institution and further including means for enabling the receiving institution to which the bundle is addressed to retrieve said bundle in the format selected by said receiving institution upon one of (a) demand from the receiving institution, (b) instructions by the originating institution and (c) within a prearranged time period.

48. The system of claim 45 further including security procedures for preventing unauthorized reception, transmission, translation and storage of any financial instrument information within the system.

49. The system of claim 45 wherein said data file transmitted from said originating institution includes co-mingled financial instrument information intended for multiple receiving institutions.

50. The system of claim 49 further including a means for separating said co-mingled financial instrument information corresponding to each of the multiple receiving institutions.

51. The system of claim 50 wherein said processor translates said separated financial instrument information into one or more data file formats selected by each of the multiply receiving institutions.

52. The system of claim 46 wherein said processor separately translates more than one bundle of said separated financial instrument information into one or more data file formats acceptable to one or more separate settlement mechanisms to which the information in the bundles is separately directed.

53. The apparatus of claim 45 wherein at least one portion of the separated financial instrument information comprises detailed information concerning each of one or more cash items.

54. The apparatus of claim 45 wherein at least one portion of the separated financial instrument information in a bundle comprises one or more than one of an electronic funds transfer and a paper instrument.

55. The apparatus of claim 45 wherein at least one portion of the bundled financial instrument information comprises detailed information concerning one of a check, a money order, a share order, and a draft.

56. The apparatus of claim 53 wherein the detailed information is derived from an MICR line.

57. The system of claim 56 in which the information from the MICR line includes at least one of the routing transit number, customer account number and currency amount.

58. The system of claim 45 wherein said financial instrument information further comprises identifying information with respect to an account at an institution of first deposit in which said financial instrument is deposited.

59. The system of claim 58 wherein said institution of first deposit is said originating institution.

60. The system of claim 58 wherein said originating institution is not the institution of first deposit.

61. A process for effecting one or more of the electronic reception, transmission, translation and storage of data files containing information relating to co-mingled financial instruments among multiple institutions, said financial instruments being exchanged between and among the institutions, comprising:

receiving a data file from an originating institution, said data file comprising co-mingled financial instrument information addressed to multiple receiving institutions being in a first file format established by the originating institution and containing a designation that specified information in the data file is to be received by a predetermined institution;

separating said co-mingled financial instrument information into one or more discrete bundles of information, each of which is associated with predetermined institution specified as the recipient of the information:

translating each bundle of said separated financial instrument information in said first data file format into a data file format selected by the receiving institution associated therewith;

storing said bundled financial instrument information in a memory that is uniquely accessible to the institution specified as the recipient of the information; and transmitting said bundled financial instrument information in said second translated data file format to the institution that is to receive the information upon one of (a) demand from the institution that is to receive the information, (b) instructions by the originating institution and (c) within a prearranged time period.

62. The process of claim 61 wherein each separated bundle of financial instrument information contains identifying information with respect to both the originating institution and the institution that is designated to receive said bundle.

63. The process of claim 61 wherein said financial instrument information further comprises identifying information with respect to an account at an institution of first deposit in which at least one financial instrument is deposited.

64. The process of claim 61 further including the step of performing a security authorization procedure for limiting only authorized originating and receiving institutions to effect one or more of the reception, transmission, translation and storage of any financial instrument information.

65. The process of claim 61 including the step of transmitting information derived from at least one portion of said bundled financial instrument information to a settlement mechanism in a data file format acceptable to said settlement mechanism, the step of transmitting including the step of designating by a receiving institution the settlement mechanism to which the information should be sent.

66. The process of claim 61 wherein said data file received from said originating institution includes co-mingled financial instrument information intended for multiple receiving institutions.

67. The process of claim 66 further including the step of separating said co-mingled financial instrument information intended for multiple receiving institutions.

68. The process of claim 67 further including the step of translating said separated financial instrument information into one or more data file formats selected by each of the multiple receiving institutions.

69. The process of claim 65 further including the step of translating said at least one portion of the separated financial instrument information into one or more data file formats corresponding to a data file format acceptable to each of one or more settlement mechanisms to which the portions are sent.

70. The process of claim 63 wherein said institution of first deposit is said originating institution.

71. The process of claim 63 wherein said originating institution is not the institution of first deposit.

72. The process of claim 62 further including validating identifying information of the originating institution and each of the multiple receiving institutions; authenticating the co-mingled financial instrument information contained in said first data file format with respect to predetermined data format parameters; and determining a preselected data file format acceptable to each receiving institution.

73. The process of claim 61 further including storing one of said co-mingled financial instrument information and said bundled financial instrument information for an archival purpose.

74. The process of claim 61 further including enabling each receiving institution to retrieve the bundle of the separated financial instrument information with which each is associated in a data file format compatible with said receiving institution upon one of (a) demand from the institution that is to receive the information, (b) instructions by the originating institution and (c) within a prearranged time period.

75. The process of claim 61 wherein at least one portion of the separated financial instrument information comprises detailed information concerning each of one or more cash items.

76. The process of claim 61 wherein the financial instrument information comprises information of an electronic funds transfer and/or a paper instrument.

77. The process of claim 76 wherein the paper instrument financial instrument information comprises detailed information concerning one of a check, a money order, a share order, and a draft.

78. The process of claim 75 wherein the financial instrument information includes detailed information derived from an MICR line.

79. The process of claim 78 in which the information from the MICR line includes at least one of the routing transit number, customer account number and currency amount.

80. A process for effecting one or more of the reception, transmission, translation and storage of data files containing information relating to financial instruments among multiple institutions, said financial instruments being exchanged between and among the institutions, comprising:

receiving a data file from an originating institution, said data file being in a first file format established by the originating institution and containing co-mingled financial instrument information intended for multiple receiving institutions and identifying portions of the information with respect to the originating institution as to each of the multiple receiving institutions to which one or more than one portion is to be sent;

validating the identifying information of the originating institution and each of the receiving institutions;

authenticating the co-mingled financial instrument information contained in said first data format with respect to predetermined data format parameters;

determining a preselected data file format acceptable to each receiving institution;

performing security procedures for limiting only authorized originating and receiving institutions to effect one or more of the reception, transmission, translation and storage of said financial instrument information;

separating the co-mingled financial instrument information into different portions corresponding to each receiving institution;

translating each portion of said data file in said first file format into a file format selected by the receiving institution;

storing each portion of the separated financial instrument information in a memory storage device unique to the receiving institution corresponding thereto;

transmitting each portion of the separated financial instrument information stored in the memory storage device to, and in the file format selected by, the receiving institution corresponding thereto; and storing one of said co-mingled financial instrument information and said separated financial instrument information for an archival purpose.

81. The process of claim 80 further including enabling each receiving institution to retrieve the portion of the separated financial instrument information corresponding to said receiving institution upon one of (a) demand from the institution that is to receive the information, (b) instructions by the originating institution and (c) within a prearranged time period.

82. The process of claim 80 wherein at least one portion of the separated financial instrument information comprises detailed information concerning each of one or more cash items.

83. The process of claim 80 wherein at least one portion of the separated financial instrument information comprises an electronic funds transfer.

84. The process of claim 80 wherein at least one portion of the separated financial instrument information comprises detailed information concerning one of a check, a money order, a share order, and a draft.

85. The process of claim 82 wherein the detailed information is derived from an MICR line.

86. The process of claim 85 in which the information from the MICR line includes at least one of the routing transit number, customer account number and currency amount.

87. The process of claim 80 further including enabling the receiving institution to retrieve the financial instrument information in said second data file format upon one of demand from the receiving institution, based on instructions by the originating institution, and within a prearranged time period.

88. The process of claim 80 wherein said data file received from said originating institution includes co-mingled financial instrument information intended for multiple receiving institutions.

89. The process of claim 88 further including the step of separating said co-mingled financial instrument information intended for the multiple receiving institutions.

90. The process of claim 89 further including the step of translating said separated financial instrument information into one or more data file formats selected by each of the multiple receiving institutions.

91. The process of claim 80 further including the step of translating at least one portion of said separated financial instrument information into one or more data file formats corresponding to a data file format acceptable to each of one or more settlement mechanisms.

* * * * *

UNITED STATES PATENT AND TRADEMARK OFFICE
CERTIFICATE OF CORRECTION

PATENT NO. : 5,717,868
APPLICATION NO. : 08/399763
DATED : February 10, 1998
INVENTOR(S) : David L. James It is certified that error appears in the above-identified patent and that said Letters Patent is hereby corrected as shown below:

At column 8, line 41, delete "30" before "for."

At column 8, line 21, insert --10-- after "system's."

At column 6, line 37, delete "01" and insert --O1-- therefor.

At column 6, line 40, delete "RI" and insert --R1-- therefor.

At column 6, line 47, delete "01" and insert --O1-- therefor.

At column 13, line 13, delete "by" and insert --(c)-- therefor.

At column 16, line 17, delete "second."

Signed and Sealed this

Twenty-second Day of May, 2007

JON W. DUDAS
*Director of the United States Patent and Trademark Office*

(12) EX PARTE REEXAMINATION CERTIFICATE (6714th)
United States Patent
James

(10) Number: US 5,717,868 C1
(45) Certificate Issued: Mar. 24, 2009

(54) ELECTRONIC PAYMENT INTERCHANGE CONCENTRATOR

(75) Inventor: David L. James, Dublin, OH (US)

(73) Assignee: DataTreasury Corporation, Plano, TX (US)

Reexamination Request:
No. 90/008,685, Jun. 7, 2007

Reexamination Certificate for:
Patent No.: 5,717,868
Issued: Feb. 10, 1998
Appl. No.: 08/399,763
Filed: Mar. 7, 1995

Certificate of Correction issued May 22, 2007.

(51) Int. Cl.
*G06Q 40/00* (2006.01)

(52) U.S. Cl. .......................... 705/35; 705/39
(58) Field of Classification Search ............ 705/35, 705/39, 44
See application file for complete search history.

(56) References Cited

U.S. PATENT DOCUMENTS

| | | |
|---|---|---|
| 4,017,101 A | 4/1977 | Case |
| 4,172,552 A | 10/1979 | Case et al. |
| 4,201,978 A | 5/1980 | Nally |
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | De la Guardia |
| 4,358,671 A | 11/1982 | Case |
| 4,404,649 A | 9/1983 | Nunley et al. |
| 4,417,136 A | 11/1983 | Rushby et al. |
| 4,448,419 A | 5/1984 | Telnaes |
| 4,457,015 A | 6/1984 | Nally et al. |
| 4,500,750 A | 2/1985 | Erlander et al. |
| 4,523,330 A | 6/1985 | Cain |
| 4,555,617 A | 11/1985 | Brooks et al. |
| 4,578,530 A | 3/1986 | Zeidler |
| 4,652,990 A | 3/1987 | Pailen et al. |
| 4,675,815 A | 6/1987 | Kuroki et al. |
| 4,680,803 A | 7/1987 | Dilella |
| 4,694,147 A | 9/1987 | Amemiya et al. |
| 4,694,397 A | 9/1987 | Grant et al. |
| 4,723,283 A | 2/1988 | Nagasawa et al. |

(Continued)

FOREIGN PATENT DOCUMENTS

CA 2131667 6/1995

(Continued)

OTHER PUBLICATIONS

"Wachovia's Motion for Summary Judgment for Claim Invalidity Based on Indefiniteness of U.S. Patent No. 5,717,868," pp. 1–23, filed Jul. 9, 2007, in *DataTreasury Corporation v. Wells Fargo & Company, et al.,* Civil Action No. 2:06–CV–72 DF, In the United States District Court for the Eastern District of Texas, Marshall Division, including Exhibits B–D.

(Continued)

*Primary Examiner*—Jimmy G Foster

(57) ABSTRACT

An apparatus, system and process for effecting one or more of the reception, transmission, translation and storage of data files containing information relating to financial instruments among and between multiple institutions wherein a data file in a first file format is received from an originating institution, the file is translated into a second data file format selected by an institution that is to receive the information, the information is stored in memory which is uniquely accessible to the receiving institution and transmitted to the receiving institution. Information derived from the financial instrument information contained in the second data file format may be transmitted to a settlement mechanism. The transmission to the receiving institution and to a settlement mechanism may occur on demand, based on instructions by the originating institution and within a prearranged time period.

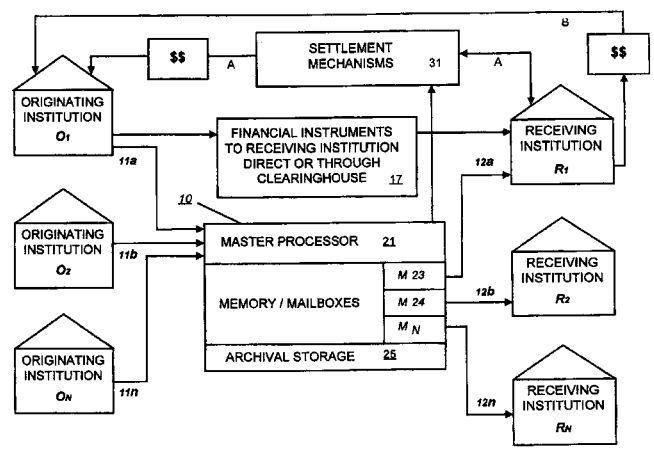

U.S. PATENT DOCUMENTS

| | | | |
|---|---|---|---|
| 4,727,243 A | 2/1988 | Savar | |
| 4,742,457 A | 5/1988 | Leon et al. | |
| 4,745,267 A | 5/1988 | Davis et al. | |
| 4,747,058 A | 5/1988 | Ho | |
| 4,748,557 A | 5/1988 | Tamada et al. | |
| 4,750,201 A | 6/1988 | Hodgson et al. | |
| 4,755,940 A | 7/1988 | Brachtl et al. | |
| 4,757,543 A | 7/1988 | Tamada et al. | |
| 4,771,460 A | 9/1988 | Tamada et al. | |
| 4,823,264 A | 4/1989 | Deming | |
| 4,843,220 A | 6/1989 | Haun | |
| 4,858,121 A | 8/1989 | Barber et al. | |
| 4,882,779 A | 11/1989 | Rahtgen | |
| 4,888,812 A | 12/1989 | Dinan et al. | |
| 4,910,774 A | 3/1990 | Barakat | |
| 4,912,762 A | 3/1990 | Lee et al. | |
| 4,922,503 A | 5/1990 | Leone | |
| 4,926,325 A | 5/1990 | Benton et al. | |
| 4,941,125 A | 7/1990 | Boyne | |
| 4,948,174 A | 8/1990 | Thomson et al. | |
| 4,960,981 A | 10/1990 | Benton et al. | |
| 4,961,142 A | 10/1990 | Elliott et al. | |
| 4,962,531 A | 10/1990 | Sipman et al. | |
| 4,972,463 A | 11/1990 | Danielson et al. | |
| 4,974,878 A | 12/1990 | Josephson | |
| 4,977,595 A | 12/1990 | Ohta et al. | |
| 4,985,921 A | 1/1991 | Schwartz | |
| 5,003,594 A | 3/1991 | Shinagawa | |
| 5,014,311 A | 5/1991 | Schrenk | |
| 5,016,277 A | 5/1991 | Hamilton | |
| 5,050,078 A | 9/1991 | Sansone | |
| 5,053,607 A | 10/1991 | Carlson et al. | |
| 5,054,096 A | 10/1991 | Beizer | |
| 5,081,680 A | 1/1992 | Bennett | |
| 5,091,968 A | 2/1992 | Higgins et al. | |
| 5,097,517 A | 3/1992 | Holt | |
| 5,122,950 A | 6/1992 | Benton et al. | |
| 5,123,047 A | 6/1992 | Rosenow | |
| 5,144,115 A | 9/1992 | Yoshida | |
| 5,159,548 A | 10/1992 | Caslavka | |
| 5,163,098 A | 11/1992 | Dahbura | |
| 5,168,444 A | 12/1992 | Cukor et al. | |
| 5,170,466 A | 12/1992 | Rogan et al. | |
| 5,173,594 A | 12/1992 | McClure | |
| 5,175,682 A | 12/1992 | Higashiyama et al. | |
| 5,175,766 A | 12/1992 | Hamilton | |
| 5,185,798 A | 2/1993 | Hamada et al. | |
| 5,187,750 A | 2/1993 | Behera | |
| 5,195,133 A | 3/1993 | Kapp et al. | |
| 5,198,975 A | 3/1993 | Baker et al. | |
| 5,200,993 A | 4/1993 | Wheeler | |
| 5,204,811 A | 4/1993 | Bednar et al. | |
| 5,214,697 A | 5/1993 | Saito | |
| 5,220,501 A | 6/1993 | Lawlor et al. | |
| 5,233,656 A | 8/1993 | Landgrand et al. | |
| 5,235,433 A | 8/1993 | Clarkson et al. | |
| 5,237,158 A | 8/1993 | Kern et al. | |
| 5,237,159 A | 8/1993 | Stephens et al. | |
| 5,237,500 A | 8/1993 | Perg et al. | |
| 5,241,600 A | 8/1993 | Hillis | |
| 5,256,863 A | 10/1993 | Ferguson et al. | |
| 5,259,025 A | 11/1993 | Monroe et al. | |
| 5,265,007 A | 11/1993 | Barnhard, Jr. et al. | |
| 5,274,567 A | 12/1993 | Kallin et al. | |
| 5,283,829 A | 2/1994 | Anderson | |
| 5,287,497 A | 2/1994 | Behera | |
| 5,317,637 A | 5/1994 | Pichlmaier et al. | |
| 5,321,238 A | 6/1994 | Kamata et al. | |
| 5,321,751 A | 6/1994 | Ray et al. | |
| 5,321,816 A | 6/1994 | Rogan et al. | |
| 5,326,959 A | 7/1994 | Perazza | |
| 5,337,358 A | 8/1994 | Axelrod et al. | |
| 5,341,428 A | 8/1994 | Schatz | |
| 5,343,529 A | 8/1994 | Goldfine et al. | |
| 5,345,090 A | 9/1994 | Hludzinski | |
| 5,373,550 A | 12/1994 | Campbell et al. | |
| 5,396,558 A | 3/1995 | Ishiguro et al. | |
| 5,408,531 A | 4/1995 | Nakajima | |
| 5,412,190 A | 5/1995 | Josephson et al. | |
| 5,434,928 A | 7/1995 | Wagner et al. | |
| 5,436,970 A | 7/1995 | Ray et al. | |
| 5,440,634 A | 8/1995 | Jones et al. | |
| 5,444,794 A | 8/1995 | Uhland, Sr. | |
| 5,446,796 A | 8/1995 | Ishiguro et al. | |
| 5,454,575 A | 10/1995 | Del Buono | |
| 5,457,747 A | 10/1995 | Drexler et al. | |
| 5,473,143 A | 12/1995 | Vak et al. | |
| 5,479,510 A | 12/1995 | Olsen et al. | |
| 5,484,988 A | 1/1996 | Hills et al. | |
| 5,502,765 A | 3/1996 | Ishiguro et al. | |
| 5,506,691 A | 4/1996 | Bednar et al. | |
| 5,524,073 A | 6/1996 | Stambler | |
| 5,526,409 A | 6/1996 | Conrow et al. | |
| 5,528,705 A | 6/1996 | Reasoner, Jr. et al. | |
| 5,539,822 A | 7/1996 | Lett | |
| 5,539,825 A | 7/1996 | Akiyama et al. | |
| 5,544,043 A | 8/1996 | Miki et al. | |
| 5,544,255 A | 8/1996 | Smithies et al. | |
| 5,557,518 A | 9/1996 | Rosen | |
| 5,577,121 A | 11/1996 | Davis et al. | |
| 5,583,759 A | 12/1996 | Geer | |
| 5,590,038 A | 12/1996 | Pitroda | |
| 5,590,196 A | 12/1996 | Moreau | |
| 5,596,642 A | 1/1997 | Davis et al. | |
| 5,602,933 A | 2/1997 | Blackwell et al. | |
| 5,602,936 A | 2/1997 | Green et al. | |
| 5,604,640 A | 2/1997 | Zipf et al. | |
| 5,604,802 A | 2/1997 | Holloway | |
| 5,608,800 A | 3/1997 | Hoffman et al. | |
| 5,613,001 A | 3/1997 | Bakhoum | |
| 5,615,269 A | 3/1997 | Micali | |
| 5,621,796 A | 4/1997 | Davis et al. | |
| 5,621,797 A | 4/1997 | Rosen | |
| 5,623,547 A | 4/1997 | Jones et al. | |
| 5,625,694 A | 4/1997 | Lee et al. | |
| 5,629,981 A | 5/1997 | Nerlikar | |
| 5,633,930 A | 5/1997 | Davis et al. | |
| 5,642,419 A | 6/1997 | Rosen | |
| 5,647,017 A | 7/1997 | Smithies et al. | |
| 5,657,389 A | 8/1997 | Houvener | |
| 5,657,396 A | 8/1997 | Rudolph et al. | |
| 5,659,616 A | 8/1997 | Sudia | |
| 5,668,897 A | 9/1997 | Stolfo | |
| 5,673,333 A | 9/1997 | Johnston | |
| 5,682,549 A | 10/1997 | Tanaka et al. | |
| 5,708,810 A | 1/1998 | Kern et al. | |
| 5,710,889 A | 1/1998 | Clark et al. | |
| 5,717,868 A | 2/1998 | James | |
| 5,751,842 A | 5/1998 | Riach et al. | |
| 5,754,673 A | 5/1998 | Brooks et al. | |
| 5,760,916 A | 6/1998 | Dellert et al. | |
| 5,781,654 A | 7/1998 | Carney | |
| 5,784,503 A | 7/1998 | Bleecker, III et al. | |
| 5,784,610 A | 7/1998 | Copeland, III et al. | |
| 5,787,403 A | 7/1998 | Randle | |
| 5,790,260 A | 8/1998 | Myers | |
| 5,801,366 A | 9/1998 | Funk et al. | |
| 5,825,506 A | 10/1998 | Bednar et al. | |
| 5,832,463 A | 11/1998 | Funk | |
| 5,832,464 A | 11/1998 | Houvener et al. | |
| 5,857,034 A | 1/1999 | Tsuchiya et al. | |

| | | | |
|---|---|---|---|
| 5,870,725 | A | 2/1999 | Bellinger et al. |
| 5,884,271 | A | 3/1999 | Pitroda |
| 5,910,988 | A | 6/1999 | Ballard |
| 5,926,288 | A | 7/1999 | Dellert et al. |
| 5,930,778 | A | 7/1999 | Geer |
| 5,973,731 | A | 10/1999 | Schwab |
| 6,032,137 | A | 2/2000 | Ballard |
| 6,059,185 | A | 5/2000 | Funk et al. |
| 6,108,104 | A | 8/2000 | Tesavis |
| 6,115,509 | A | 9/2000 | Yeskel |
| 6,145,738 | A | 11/2000 | Stinson et al. |

FOREIGN PATENT DOCUMENTS

| | | |
|---|---|---|
| EP | 0 454 303 | 10/1991 |
| EP | 0 481 135 | 4/1992 |
| EP | 0 519 843 | 12/1992 |
| EP | 0 593 209 | 4/1994 |
| EP | 0661654 A2 | 7/1995 |
| EP | 0 671 696 | 9/1995 |
| EP | 0 678 829 | 10/1995 |
| GB | 2 251 098 | 6/1992 |
| GB | 2 294 566 | 5/1996 |
| WO | WO 90/04837 A | 5/1990 |
| WO | WO 91/06058 A | 5/1991 |
| WO | WO 92/10901 | 6/1992 |
| WO | WO 93/02424 | 2/1993 |
| WO | WO 95/12859 | 5/1995 |
| WO | WO 95/30199 | 11/1995 |
| WO | WO 97/07468 | 2/1997 |
| WO | WO 97/22060 | 6/1997 |
| WO | WO 97/36254 | 10/1997 |
| WO | WO 97/36266 | 10/1997 |
| WO | WO 97/36267 | 10/1997 |
| WO | WO 97/38402 | 10/1997 |
| WO | WO 98/47100 A | 10/1998 |
| WO | WO 98/58356 A | 12/1998 |

OTHER PUBLICATIONS

A. Greenspan, "Clearing and Settlement: Past and Future", American Banker, Oct. 26, 1990, p. 4.

"Proposals for Long–Term Improvements to the Check Collection System", American Banker Plus, Feb. 4, 1988.

"Electronic Payments Volume Will Gain at Corporations", American Banker, Dec. 5, 1983, p. 30.

"Boycott of Automated Clearing System in London is Said Close to Resolution", American Banker, Mar. 28, 1984, p. 2.

"About FSTC: FSTC History," FSTC, 2003.

American National Standard For Financial Image Interchange ("ANSI"): Architecture, Overview and System Design Specification, X9.xx0.7, dated: 1994.

"ANSI/ABA X9.46–1995, Draft version 0.13, American National Standard for Financial Image Interchange; Architecture, Overview and System Design Specification."

"ANSI/ABA X9.46–1997, American National Standard for Financial Image Interchange: Architecture, Overview and System Design Specification." Copyright 1996.

Anderson, "Electronic Check and Check Law," letter to Robert Ballen, Apr. 8, 1996.

Ansi6v4[1].ppt—PowerPoint Presentation—FSTC—Financial Services Technology Consortium, Sep. 30 to Oct. 1, 1996.

"AT&T Global offers one–step imaging," American Banker, vol. 159, No. 39, p. 14A(1), Feb. 28, 1994.

"AT&T Partners with Fiserv to Form Single Source Provider for Leading Image Item Processing Solutions," PR Newswire, at 913CL011, Sep. 13, 1995.

ATZEL, (email to Hambro, Oct. 9, 2001).

"At Your Service . . . ," Federal Reserve Bank of Kansas City, 1995.

"Baby boomers, Generation X are both addicted to ATM," AT&T News Release, Feb. 28, 1995.

"BancTec Inc. has received another order for its image startement processing product (First National Bank of Chicago orders)," Nov. 13, 1991.

BancTec's Proposal to the Federal Reserve Bank of Boston, "Technical Volume: Check Image Processing Archive and Retrieval System," Jul. 8, 1994, JPMC–BANCT 002960–003299 and JPMC–BANCT 001017–001144.

BancTec's Proposal to the Federal Reserve Bank of Boston, "Technical Volume: Total Solution Overview" Jul. 8, 1994, JPMC–BANCT 001017–001144.

Banet, B., "Document image processing, 1991: The imaging edge," Seybold Rep. on Publishing Systs, vol. 20, No. 19, Jun. 24, 1991.

"Bank Automation News," Finance & Banking Newsletter, vol. 9, Iss. 6, Apr. 2, 1997.

"Banks to Check Out Imaging (Solutions)," Communications Week International 1992, No. 093, p. 46, Oct. 19, 1992.

Barhel, M., "NCR and Unisys exchange check images in a pivotal test (computer makers test compatibility of check imaging systems)," American Banker, vol. 158, No. 67, p. 3(1), Apr. 8, 1993.

Barthel, Matt, "Unisys, Bantec offer PC–based imaging: high–tech check statements produced; community banks are market," American Banker, vol. 157, No. 195, p. 3(1), Oct. 8, 1992.

Bartholomew, D., "More Checks on Checks—Bank of America plan to convert to an IBM imaging system that screens checks faster and more thoroughly (spotlight)," Informationweek, 1994, No. 504, p. 32, Dec. 5, 1994.

"Bill Processing: US West Re–Engineers with $7.2 Million Unisys Image–based Remittance Processing Solution," Edge, on & about AT&T, vol. 10, No. 378, Oct. 23, 1995.

Blankenhorn, D., "Cincinnati Bell and Unisys go into bank imaging," Newsbytes, p. NEW10240020, Oct. 24, 1990.

Block, V., "USAA Federal gets imaging system," American Banker, vol. 159, No. 49, p. 6A(1), Mar. 14, 1994.

Booker, E., "Bank to test scalable NCR imaging for check processing," Computerworld, p. 66, Dec. 14, 1992.

Brown, J., "Imaging may dramatically alter bank data networks," Network World, vol. 6, No. 19, p. 6(2), May 15, 1989.

Buchok, J., "OCR gets processing credit," Computing Canada, vol. 19, No. 26, Dec. 20, 1993.

"Chase's New Image," Information Week, No. 517, at 14, Mar. 6, 1995.

Check[1].ppt—PowerPoint Presentation—Current Check Flow, Dec. 12, 1995.

"Check Image Exchange Project (a.k.a. Interbank Check Imaging Project)," at www.fstc.org/projects/imaging/index.cfm.

"Check–Image Interchange Inches Closer," Bank Technology News, vol. 10, No. 1, p. 19+, Jan. 1997.

"Checks & Checking: Check Imaging at the Teller Station (Alliance Integration & Services Introduces Imaging System that can be Installed at Bank Teller Stations)," Bank Technology News, vol. 9, No. 10, at 37, Oct. 1996.

"Chemical Chooses IBM Check Imaging (Chemical Banking Corp to install IBM's ImagePlus High Performance Transaction System to process 9 mil checks daily)," Bank Technology News, vol. 8, No. 9, p. 11, Sep. 1995.

"Cincinnati Bell: CBIS & Unisys in Major Imaging Agreement," Edge, on & about AT&T, vol. 5, No. 118, Oct. 29, 1990.

"Cincinnati Bell Information Systems (Integrator Briefs)," Computer Reseller News, 1993, No. 534, p. 129, Jul. 12, 1993.

Complaint in *DataTreasury Corp.* v. *Bank One Corp.,* Cause No. 3–03CV0059–K, In the United States District Court for the Northern District of Texas, Dallas Division.

Complaint in *DataTreasury Corp.* v. *First Data Corporation, et al.,* Cause No. 502CV094, In the United States District Court for the Eastern District of Texas, Texarkana Division.

Complaint in *Data Treasury Corp.* v. *RDM Corp., a.k.a. Research Development and Manufacturing Corp.,* Cause No. 3–02CV2641–M, in the United States District Court for the Northern District of Texas, Dallas Division.

Complaint in *DataTreasury Corp.* v. *Ingenico S.A., et al.,* Cause No. 502DV095, In the United States District Court for the Eastern District of Texas, Texarkana Division.

Complaint in *DataTreasury Corp.* v. *J.P. Morgan Chase & Co., et al.,* Cause No. 502CV124, In the United States District Court for the Eastern District of Texas, Texarkana Division.

"Computerm Announces Remote Check Imaging Support for VMC 8200 High–Speed Channel Extension System," PR Newswire at 408LAM012, Apr. 8, 1996.

"Computerm Eases Remote Imaging," American Banker, vol. 158, No. 156, at 13A(1), Aug. 16, 1993.

"Computerm Enables Boatmen's Bancshares to Execute Remote Check Imaging," PR Newswire at 408LAM013, Apr. 8, 1996.

Cooney, M., "Frame relay comes to Computer extenders," Network World, Jun. 28, 1993.

Cortese, Amy, "Image Yields Interest at Banks (Collaboration Results in Imaging System to Automate Check Processing," ComputerWorld, at 6, Mar. 19, 1990.

Costanzo, C., "As Banks Cling to the Conventional, Check–Imaging Struts Its Stuff," Bank Technology News, p. 1, Mar. 1994.

Crockett, B., "Systematics to use deposited–check imaging; installation at firm's N.J. center would be the first to outsourcer," American Banker, vol. 158, No. 95, p. 3(1), May 19, 1993.

Crone, "Reducing Data Processing Costs with a Remote Item Processing System," Bank Administration, Oct. 1986, pp. 44–46.

Daly, B., "Unisys Acquires Visual Impact Solution for Check Processing, Archive and Image Delivery," Business Wire, p. 9181204, Sep. 18, 1997.

Daly, B., "Unisys provides services to Bank of the West to support retail banking," Business Wire, p. 9180098, Sep. 18, 1995.

"Data Compression Over Frame Relay Implementation Agreement FRF.9," Jan. 22, 1996, downloaded at http://www.frforum.com/5000/Approved/FRF.9/frf9.pdf.

"Defendants's Final Invalidity Construction Pursuant to Fourth Amended Docket Control Order and Patent Local Rules 3–3 and 3–6," pp. 1–21, Civil Action No. 5:03–CV–039 (DF), Dec. 13, 2005.

"Defendants Ingenico S.A. and Ingenico, Inc.'s Preliminary Invalidity Contentions," in *DataTreasury Corp.* v. *Ingenico S.A., et al.*CCause No. 502DV095, In the United States District Court of Texas, Texarkana Division.

"Defendants's Preliminary Invalidity Construction Pursuant to Patent Local Rules 3–3 and 3–4," in *DataTreasury Corp.,* v. *First Data Corporation, et al.,* Cause No. 502 CV094, In the United States District Court of Texas, Texarkana Division.

Depompa, Barbara, "IBM Adds Image–Based Check Processing," MIS Week, vol. 11, No. 12, at 12(1), Mar. 19, 1990.

Description of the IBM "3174 Network Processor," Oct. 7, 1992, found on the web at the URL: http://ecc400.com/ibm/controllers/314prod.htm and http://www.commercecomputer.com/3174.html.

Dinan, Painter & Rodite, "ImagePlus High Performance Transaction System," IBM Systems Journal, vol. 29, No. 3, 1990, pp. 421–434.

Document Image Report, IntraFed Touts Remote Services, vol. 6, Issue 25, Dec. 11, 1996.

Dowell, "Security," email to fstc–image, Apr. 27, 1996.

Durham, D., "Broadway & Seymour to Invest in Two Strategic Initiatives," Business Ire, p. 03151248, Mar. 15, 1995.

eCheck: Homepage, 2003.

Electronic Imaging '88—Advanced Printing of Paper Summaries, vol. 1, Anaheim, California, Mar. 1988.

Electronic Imaging '88 —Advanced Printing of Paper Summaries, vol. 1, Oct. 3–6, 1988, Boston, MA.

E–mail of May 10, 2006 titled "USPTO Reexam. C.N 90/007,829, Requested Date: Nov. 25, 2005" from "PT" <admin@patentrakker.com>.

"Entrust Encryption and Digital Signature Explained," date unknown.

Evankovitch, S., "Computer earns MCI 'Level 1' approval; Computer's industry exclusive native Frame Relay interface passes test for interoperability with MCI's Frame Relay services," Business Wire, Apr. 12, 1995.

Evans, J., "The end of the paper wait: document imaging (includes related articles on successful document imaging implementations at Borgess Medical Center, the Huntington Internal Medicine Group, the University of Alabama Health Services Foundation and Quest Diagnostic) (Industry Trend or Event)," Health Management Technology, vol. 18, No. 2, p. 16(5), Feb. 1997.

Fassett, W., "Impact of Imaging," Bank Management, vol. 67, No. 11, p. 56, Nov. 1991.

Federal Reserve Bank of Boston, "Request For Proposal For Check Image Processing And Archival And Retrieval Systems For The Federal Reserve," Apr. 21, 1994, JPMC 152558–152803.

Feighery, M., "NCR demonstrates systems for Insurance and accounting industry," AT&T News Release, May 31, 1992.

Feighery, M. and Bochonko, K., "NCR demonstrates full line of retail products at NRF conference," AT&T News Release, Jan. 18, 1993.

FileNet Product Brochure, "Introducing the Age of Document–Image Processing," The PC Connection, and Wide–Area Image Communication and System Networking, 1998, 14 pages.

"Financial EDI over the Internet, " Bank of America, 1996.

Financial Services Technology Consortium ("FSTC") Interbank Check Imaging Project White Paper, dated: Jun. 20, 1994.

Fisher, M., "IBM, Customers continue work on document image processor," Datamation, vol. 34, No. 19, Oct. 1, 1988.

Fitch, "Digital image systems speed return items, exceptions," Corporate Cashflow, May 1996.

Fitch, T., "Check image capture speeds up positive pay reconcilement," Corporate Cashflow, Feb. 1995.

Friedman, D., "Nixdorf Computer Introduces DCPA Image—A Sophisticated Document Image Processing System With Unique Capabilities," PR Newswire, Aug. 15, 1989.

FSTC Check Image Interchange Project, dated: May 25, 1995.

FSTC Check Image Interchange Project Pilot Phase 1A: Preliminary Architecture and Project Plan, dated: Jun. 30, 1995.

"FSTC Check Image Quality Subproject," date unknown.

FSTC Compilation of ANSI X9.46, Data Structure Reference, dated: Jul. 31, 1995.

FSTC Demonstrates Interbank Check Image Pilot; Multi-Vendor System Speeds check Clearing, Cuts Fraud—FSTC Pilot Lays Foundation for "Paper Check Truncation," at www.fstc.org/projects/imaging/public/information.cfm, Dec. 12, 1995.

"FSTC Image Exchange," May 21, 1996.

FSTC Image Quality Functional Requirements, dated: Jul. 26, 1995.

FSTC Interbank Check Imaging: Unisys Monthly Status Report, Jun. 26, 1996.

"FSTC Interbank check Imaging: Unisys Monthly Status Report," Jul. 22, 1996.

FSTC Pilot Overview, dated: Apr. 3, 1995.

"FSTC: Projects—Check Image Exchange Project—Project Participants," at www.fstc.org/projects/imaging/participants.cfm.

FSTC Projects: The Bank Internet Payment System (BIPS): Leading the Way to Electronic Commerce, FSTC, 2003.

Garvey, M., "Check Processing Goes Digital—Chase Manhattan Bank to store checks electronically, saving time and money," Informationweek, 1997, No. 648, p. 20, Sep. 15, 1997.

Gawen, "PC Based Document Image Processing and Signature Verification," Proceedings of the Inforamtion & Image Management Conference, 1991, pp. 389–391.

"Global Concepts—Payment Systems Consulting," at www.global-concepts.com/image_archive.htm.

Griffith, M. and Mazzola, J., "National City, NCR form strategic imaging partnership," AT&T News Release, Nov. 9, 1992.

Gullo, K., "NCR, Unisys plan check imaging for IBM Systems," American Banker, vol. 156, No. 249, p. 1(2), Dec. 30, 1991.

Haig, J., "Unisys integrates retail/wholesale lockbox solution for remittance processors," Business Wire, p. 03251075, Mar. 25, 1997.

Haig, J., "Unisys solution will support check processing at Vermont Federal," Business Wire, p. 5201185, May 20, 1996.

Helm, Sylvia, "Banks check into image processing," Computers in Banking, vol. 7, No. 3, p. 25(7), Mar. 1, 1990.

Helm, S., "Who's doing what in image processing (includes definition of image processing," ABA Banking Journal, vol. 83, No. 1, p. 31(3), Jan. 1991.

"High Volume Data Capture Sans Paper" in Bank Systems Technology, May 1996, p. 35.

Homa, "MICR Technology Helps Eliminate POS Check Fraud," Chain Store Age Executive, Sep. 1991.

Horine, J., "AT&T and Fiserv team to offer imaging solutions," Sep. 13, 1995.

"Huntington BancShares in the Forefront of Technology with Purchase of Unisys Check Imaging System," PR Newswire, p. 1, Oct. 11, 1989.

IBM Electronic Payment Systems Support/Check Processing Control Systems: Progress Reference and Operations Manual, dated: Jun. 1986.

"IBM FSTC Pilot Status".

IBM Product Announcement 190–040, (IBM 3898 Image Processor), dated: Mar. 13, 1990.

IBM's Proposal to the Federal Reserve Bank of Boston, Nov. 7, 1991, "IBM Proposal For FRB Phase Four: Image Archive System," JPMC 279955–280128, Yeskel Exhibit 1.

IBM Systems Journal, vol. 29, No. 3, 1990 (entire journal).

"IBM X9.46 Pilot Status—Summary," date unknown.

"Ibnamed, A Load Balancing Name Server Written in Perl," Sep. 17, 1995, located at the web at URL www.standford.edu/~schemers/docs/Ibnamed/Ibnamed.html.

"Ibnamed, A Load Balancing Name Server Written in Perl," Oct. 15, 2002, found on the web at the URL www.stanford.edu/~schemers/docs/Ibnamed/Ibnamed.html.

"ICI Project Security Work Session," May 10, 1996.

Image Archive Forum Flow Nos. 1–13, Sep. 1997.

Image Archive Forum Methodology and Value, Sep. 19, 1997.

Image Archive Forum, "Payment Systems Task Force Economic Framework," Jan. 27, 1998.

ImagePlus brochure by IBM, 1991.

"Image Processing Survival Guide, vol. 11: Sure–Fire Strategies for Implementing Image Remittance," Philips Business Information, Inc., 1996.

"Image systems garner NOAC spotlight (American Bankers+ Association's National Operations and Automation Conference)," Computer in Banking, vol. 6, No. 7, p. 8(4), Jul. 1989.

"Imaging in Corporate Environments: Technology and Communication," Daniel Minoli, McGraw Hill, 1994.

"Imaging products. Check Processing—IBM's ImagePlus High Performance Transaction System," United States Banker, vol. 100, No. 8, p. 23(3), Aug. 1990.

"Imaging vendors shape processing," Banking Management, vol. 69, No. 4, p. 29, Apr. 1993.

Imwalle, C. and Pratt, J., "250 U.S. banks to use NCR, Cincinnati Bell Financial systems," AT&T News Release, May 4, 1993.

"Industry Security Leader Racal Supports Visa/Mastercard Proposal for Internet," PR Newswire, Apr. 17, 1996.

INSPEC search with abstracts.

"Interbank Check Imaging," FSTC General Meeting, Orlando, FL, Apr. 17, 1997 (Exhibit 20).

"Item processing leaps ahead with VisualImpact and Windows NT (Sponsored Supplement: Unlock Your Back Office with Microsoft Back Office)," US Banker, vol. 105, No. 6, p. S4(3), Jun. 1995.

Janusky, "FSTC Interbank Check Imaging," Apr. 29, 1996.

Janusky, "FSTC Interbank Check Imaging," May 22, 1996.

Joint Marketing & Referral Agreement Between ACS Image Solutions, Inc. and JPMorgan Chase Bank.

Jones, J., "Broadway & Seymour Announces Client/Server Product for Item and Image Processing," Business Wire, p. 03201186, Mar. 20, 1995.

Jones, J., "Broadway & Seymour announces new Visualimpact release," Business Wire, p. 3291274, Mar. 29, 1996.

Klein, M., "Terminal Data to supply NCR with document microfilmers," AT&T News Release, Oct. 13, 1993.

Kraynak Maxfield, J., "Signet Processes Over 2,500 Documents/Hour in Unisys Check Imaging Tests," PR Newswire, p. 0409P8428, Apr. 9, 1991.

Kriskern, J., "Engineering a visionary solution," Datamation, vol. 36, No. 8, Apr. 15, 1990.

Kutler, J. "AT&T, IBM, Unisys join bank research group," American Banker, vol. 159, No. 124, p. 14(1), Jun. 29, 1994.

Lubetkin, S., "Unisys enters image processing market with two new products and major financial and industrial customers (product announcement)," PR Newswire, p. 1011PH009, Oct. 11, 1989.

"Magtek® Company Background & Product Guide," date unknown (Exhibit MagTek D–7).

"MagTek Unveils Excella, a Dual–side Scanner for Check 21 Applications," May 10, 2004 (Exhibit MagTek D–8).

Mantel, K., "Notes Gets in the Picture," Datamation, Jul. 15, 1992.

Marjanovic, "Payment Groups Square Off Over Electronic Check Plan," American Banker, date unknown.

Marjanovic, S., "Mich. National streamlines imaging with IBM system (check imaging)," American Banker, vol. 160, No. 176, Sep. 13, 1995.

Marjanovic, Steven, "Home Loan Bank to Offer Check–Image Statements to Members+ Customers," American Banker, vol. 159, No. 248, at 14(1), Dec. 29, 1994.

Mazzola, J., "NCR and NYCH to develop image–based check notification system," AT&T News Release, Aug. 24, 1992.

Mazzola, J. and Hendrickson, L., "NCR deposit processing technology speeds banking operations," AT&T News Release, Dec. 7, 1992.

Mazzola, J. and Hendrickson, L., "Wachovia tests NCR's new imaging item processing system," AT&T News Release, Nov. 15, 1991.

Mazzola, J., Hendrickson, L. and Gatati G., "NCR signs DSI alliance for imaging statement processing," AT&T News Release, Jul. 20, 1992.

Mazzola, J., Hendrickson, L., and Waters, R., "NCR, CKI to market image–based credit card chargeback system," Jan. 6, 1993.

Mazzola, J. and O'Donohue, M., "Frost National Bank selects NCR over old mainframe environment," AT&T News Release, Apr. 28, 1993.

McGinn, Janice, "IBM ImagePlus High Performance Transaction System (IBM Harnesses Image Processing to Make its 389x/XP Cheque Processors More Efficient)," Computergram International, No. 1389, at CG103210008, Mar. 21, 1990.

McKee, K., and Gundlach, D., "Retail Banking Solution enhanced," AT&T News Release, May 21, 1990.

Messmer, E., "Hurdles stand in way of electronic banking," Network World, p. 33, Sep. 4, 1995.

"Microsoft Introduces SNA Server Version 3.0, Begins Beta Testing," Microsoft Press Release, Aug. 29, 2006, found at: http://www.microsoft.com/presspass/press/1996/jun96/sna30pr.mspx.

Moore, J., "IBM, Unisys test check systems for Fed Reserve," Federal Computer Week, vol. 6, No. 21, p. 6(2), Jul. 27, 1992.

Moreau, Thierry, "Payment by Authenticated Facsimile Transmission, a Check Replacement Technology for Small and Medium Enterprises," Nov. 25, 2006, found at: http://connotech.com/PAYPROC.HTM.

Morris, H.M. and Orth, R.H., Image system communications, IBM Systems Journal, vol. 29, No. 3, 1990, pp. 371–383.

Murphy, P., "POD Check Imaging Faces Challenges (In 1995, vs. 1996, banks raised Investment in check imaging by 9% from $198 mil and $215 mil; new lost cost POD technology keeps costs down)," Bank Technology News, vol. 10, No. 3, p. 23, Mar. 1997.

"NCReports: Financial Services Trends and Technologies," Issue 1, NCR, Jan. 1997.

"NCReports: Financial Services Trends and Technologies," Issue 2, NCR, Jan. 1997.

"NCReports: Financial Services Trends and Technologies," Issue 3, NCR, Jan. 1997.

"NCReports: Financial Services Trends and Technologies," Issue 4, NCR, Jan. 1997.

"NCReports: Financial Services Trends and Technologies," Issue 5, NCR, Jan. 1997.

"NCReports: Financial Services Trends and Technologies," vol. 1, Issue 6, NCR, Jan. 1997.

"NCReports: Financial Services Trends and Technologies," vol. 1, Issue 7, NCR, 1997.

"NCReports: Financial Services Trends and Technologies," vol. 1, Issue 8, NCR, 1999.

NCR 7780 Brochure, copyrighted 1989.

"NCR—Hardware—7780 Mid–Range Item Processing Transport," at www.ncr.com/products/hardware/hw_7780_product.htm.

"NCR—Hardware—7780, Technical Specifications," at www.ncr.com/products/hardware/nw_7780_ts_product.htm.

"NCR offers new image–based Document Management System," AT&T News Release, Jun. 23, 1992.

"NCR Unveils Client–Server Check Imaging," Bank Technology News, vol. 9, No. 3, p. 23, Mar. 1, 1996.

Nixon, B., "Is check imaging for you? (automation in banking) (includes related article)," Savings & Community Banker, vol. 2, No. 10, p. 28(6), Oct. 1993.

No1016v4[1].ppt—PowerPoint Presentation—FSTC—Interbank Check Image Project, Sep. 30 to Oct. 1, 1996.

"NSSDC's Mass Storage System Evolves," Mar. 1995, found on the web at the URL: http://nssdc.gsfc.nasa.gov/nssdc_news/march95/09_i_behnke_0395.html.

O'Heney, S., "Prepare for the image revolution (Banker and Vendors) (image processing: includes related article listing image processing products) (buyers guide)," Computers in Banking, vol. 6, No. 10, p. 24(6), Oct. 1989.

"On the imaging technology front," American Banker, vol. CLXI, No. 68, p. 26, Apr. 10, 1996.

PACESBusReq3[1].doc—Microsoft Word Doc—"PACES Paperless Automated Check Exhange & Settlement—Business Requirement," Apr. 3, 1998.

PacesOverview40[1].ppt.—PowerPoint Presentation.

PACESPRO[1].doc—Microsoft Word Doc—"PACES Paperless Automated Check Exchange & Settlement—Project Proposal," Apr. 23, 1998.

PACESRequirements[1].doc—Microsoft Word Doc—"PACES Paperless Automated Check Exchange & Settlement—Requirements Document," Apr. 3, 1998.

"PACES Models—FSTC Project," presentation by Mariano Roldan on Jul. 17, 1997 (Exhibit 21).

"PACES Paperless Automated Check Exchange & Settlement Next Step," presentation by John Fricke at New York, NY on Aug. 12, 1997 (Exhibit 19).

Plesums, C.A. and Bartels, R.W., Large Scale Image Systems: USAA Case Study, IBM Systems Journal, vol. 29, No. 3, 1990, pp. 343–355.

"Preliminary Invalidity Contentions of Defendants J.P. Morgan Chase & Co. and JPMorgan Chase Bank," in *DataTreasury Corp. v. J.P. Morgan Chase& Co., et al.*, Cause No. 502CV124, In the United States District Court for the Eastern District of Texas, Texarkana Division.

"Press Release, Cisco Partners with AT&T on Network Switch Manufacturing," Sep. 26, 1995, found on the web at http://www.lucent.com/press/0995/950926.mma.html.

Press Release "MagTek Adds Enhanced Reading to MicrimageTM," Jan. 9, 2003 (Exhibit MagTek D–11).

Press Release "MagTek Upgrades Its MicrimageTM Check Reader/Scanner," Jun. 12, 2002 (Exhibit MagTek D–9).

Press Release "MagTek's MICRImage Transmits Check Images at Speed of Ethernet," Feb. 14, 2002 (Exhibit D–10).

Press Release, "NCR Document Management System Includes Kodak, Ricoh Products," Apr. 6, 1993.

Press Release, "NCR Introduces Scalable Image Item Processing Solution," Jan. 19, 1996.

"Regions Bank Selects ImageSoft to Provide Image Solutions," Business Wire, at 9161220, Sep. 16, 1997.

Rivest, R.L., Shamir, A., Adleman, L., "A Method for Obtaining Digital Signatures and Public–Key Cryptosystems," date unknown.

Robinson, G., "Universal Card purchases BancTec ImageFirst system," AT&T News Release, Dec. 22, 1992.

Roldan, Jr., "Image Quality White Paper," FSTC, 1999.

Roldan, M., "Paperless Automated Check Exchange and Settlement (PACBS) (status update) (PACES completes specification and design of image exchange environment and is accepted as part of SVPCO Image Strategy," FSTC, at www.fstc.org/projects/paces/index.cfm, Jun. 22, 2000.

Roldan, Mariano, Financial Services Technology Consortium, "PACES Paperless Automated Check Exchange & Settlement Project Overview, PACES Planning Meeting, New York City," Dec. 19, 1997.

Schwartz, J., "Banks to Test Imaging for Clearing Checks," Communications Week, No. 420, p. 35, Sep. 14, 1992.

Search Report for PCT/US00/33010, Jun. 21, 2002.

Softchec Licenses 'Envision' Image Solution to West Suburban Bank, PR Newswire, at 116SETUU002, Jan. 16, 1996.

"Special Report: Fine Tunning of the Terminal Picture," Computerworld, Aug. 1983.

Spencer, H., "Scanning goes vertical: a big future for specialized check scanning; check scanning technology," Advanced Imaging, No. 10, vol. 12, p. 54, Oct. 1997.

Stellwag, C., "New ATM from AT&T GIS features automated document processing," AT&T News Release, Nov. 29, 1994.

Stellwag, C. and Bochonko, K., "NCR and Cincinnati Bell offer image processing service," AT&T News Release, Jan. 11, 1994.

Stellwag, C. and Bochonko, K., "Norwest Bank selects NCR item processing systems for lockbox," AT&T News Release, Aug. 2, 1993.

Stellwag, C., Graves, T., and Bochonko, K., "New Mexico uses NCR imaging systems for tax, revenue processing," AT&T News Release, Jul. 12, 1993.

Stellwag, C., Proto, J., and Bochonko, K., "CashFlex selects NCR item processing systems for lockbox," AT&T News Release, Jul. 12, 1993.

Stellwag, C., Roedel, R, and Bochonko, K., "NCR and Arkansas Systems announce strategic alliance," AT&T News Release, Jul. 12, 1993.

Stellwag, C., Sanders, G., and Bochonko, K., "NCR and Signet Banking to provide item processing services," AT&T News Release, Jul. 13, 1993.

"SurePOS ACE Electronic Payment Support PRPQ for 4690 OS," Version 1, Release 5, IBM, 1998, 2002.

"The Check Information Age: Vision Executive Summary Image Archive Forum, Payment System Task Force," Jan. 27, 1998.

"The Wachovia Story," Research, Development Manufacturing Corporation, 1993.

"The New Era of Check Scanning Technology," 2005 (Exhibit MagTek D–6).

Tracey, Brian, "IBM Unveils First Stage of Image–Check System," Computers in Banking, vol. 7, No. 4, at 12(3), Apr. 1990.

Tucker, T., "Broadway rolls out check imaging system for community banks," American Banker, vol. 160, No. 61, p. 14(1), Mar. 30, 1995.

"Understanding EDI," 1996.

"Unisys Enhances Check Imager (Unisys Corp makes effort to appeal to wider range of financial institutions)," American Banker, vol. CLIX, No. 205, p. 15A, Oct. 24, 1994.

Unisys, New York Clearing House, "A Proposal for an Image–Based Return Item Processing System," Jun. 1991, Unisys Document No. PDC 1010–16, JPMC–NYCH018091–018216.

"Unisys Wins Contract to Supply Imaging Solution to Chase Manhattan/FISER V Check Processing Alliance," Business Wire, at 6121175, Jun. 12, 1995.

"Unix–Based Image Statement Software," ABA Banking Journal, vol. 85, No. 2, at 80(1), Feb. 1993.

"Verifone Software Links PCs to the Point of Sale," American Banker, vol. 158, No. 156, at 13A(1), Aug. 16, 1993.

Vermeire, "Prosecution of Check Image Patent," letter to Hanna, Jul. 11, 1997.

Wagner, M., "Banc One checks out Web," Computerworld, vol. 30, No. 35, p. 69, Aug. 26, 1996.

Western Bank purchases NCR's Document Managing system, AT&T News Release, Aug. 31, 1993.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 6–21:

A memory storage mechanism that is uniquely accessible to a particular receiving institution is included in the system. An institution may receive several files representing financial instrument information from many originating institutions at different times during a typical business day. The receiving institution, however, may not need access to this information at the particular time it is sent and translated into the second data file format. [According] *Accordingly*, the information is stored in memory allocated exclusively to that particular receiving institution enabling it to retrieve the financial instrument information upon demand, at a predetermined time, based on instructions submitted by the originating institution, or within a prearranged time period. Storage devices such as magnetic tape, CD ROM, or other readable means may also permanently store the financial instrument information for archival or audit purposes.

AS A RESULT OF REEXAMINATION, IT HAS BEEN DETERMINED THAT:

The patentability of claims 45, 48, 61 and 62 is confirmed.

Claim 1 is determined to be patentable as amended.

Claim 3, dependent on an amended claim, is determined to be patentable.

New claims 92–141 are added and determined to be patentable.

Claims 2, 4–44, 46, 47, 49–60 and 63–91 were not reexamined.

1. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:

a means for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;

a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;

a means for storing said bundled financial instrument information in an addressable media where the bundled financial instrument information is uniquely accessible to the institution designated to receive the information;

means for the institution [designed] *designated* to receive the information to transmit to and to receive from the means for storing; and a means for transmitting a bundle of said stored financial instrument information from the addressable storage media to the institution designated to receive the information upon the receipt of an instruction.

*92. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:*

*a means for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;*

*a processor for separating said co-mingled records of financial instrument information into separate bundles corresponding to each of the one or more predetermined institution designated by the originating institution to receive said records and for translating the records in each bundle of said financial instrument information records from said first data file format into a data file format that is different from said first file format and that is selected by the predetermined institution designated to receive the information, said processor including program means for separating and bundling and for translating said records;*

*a means for storing said bundled financial instrument information in an addressable media where the bundled financial instrument information is uniquely accessible to the institution designated to receive the information;*

*means for the institution designated to receive the information to transmit to and to receive from the means for storing; and*

*a means for transmitting a bundle of said stored financial instrument information from the addressable storage media to the institution designated to receive the information upon the receipt of an instruction.*

*93. The apparatus of claim 92, further including a security mechanism for preventing the unauthorized one or more of the reception, transmission, translation and storage of financial instrument information.*

*94. The apparatus of claim 92, wherein said data file transmitted from said originating institution includes co-mingled financial instrument information intended for multiple receiving institutions.*

95. A system for effecting one or more of the reception, transmission, translation and storage of data files between or among institutions, said data files containing co-mingled information about financial instruments, comprising:
 a communication link between an originating institution and a master processor through which an electronic data file is sent from an originating institution, said data file being in a first file format established by the originating institution and containing identifying information with respect to both the originating institution and multiple institutions that are designated to receive different portions of the co-mingled financial instrument information;
 said processor:
  (a) validating the identifying information of the originating institution and the receiving institutions;
  (b) authenticating the co-mingled financial instrument information contained in said data file in said first data format with respect to predetermined data format parameters;
  (c) determining a preselected data file format acceptable to each receiving institution;
  (d) separating said co-mingled financial instrument information into different bundles to be associated with a designated receiving institution; and
  (e) translating each bundle of said separated financial instrument information into a data file format that is different from said first file format and that is preselected by the receiving institution corresponding thereto;
 a means for temporarily storing each bundle of said separated financial instrument information in a memory storage device in memory unique to the receiving institution associated therewith;
 a communication link for transmitting each bundle of said separated financial instrument information stored in the memory storage device to the receiving institution associated therewith; and
 an archive for storing one of said co-mingled financial instrument information and said bundles of financial instrument information.

96. The system of claim 95, further including security procedures for preventing unauthorized reception, transmission, translation and storage of any financial instrument information within the system.

97. The system of claim 95, wherein said data file transmitted from said originating institution includes co-mingled financial instrument information intended for multiple receiving institutions.

98. A process for effecting one or more of the electronic reception, transmission, translation and storage of data files containing information relating to co-mingled financial instruments among multiple institutions, said financial instruments being exchanged between and among the institutions, comprising:
 receiving a data file from an originating institution, said data file comprising co-mingled financial instrument information addressed to multiple receiving institutions being in a first file format established by the originating institution and containing a designation that specified information in the data file is to be received by a predetermined institution;
 separating said co-mingled financial instrument information into one or more discrete bundles of information, each of which is associated with a predetermined institution specified as the recipient of the information;
 translating each bundle of said separated financial instrument information in said first data file format into a data file format that is different from said first data file format and that is selected by the receiving institution associated therewith;
 storing said bundled financial instrument information in a memory storage device in memory that is uniquely accessible to the institution specified as the recipient of the information; and
 transmitting said bundled financial instrument information in said second translated data file format to the institution that is to receive the information upon one of (a) demand from the institution that is to receive the information, (b) instructions by the originating institution and (c) within a prearranged time period.

99. The process of claim 98, wherein each separated bundle of financial instrument information contains identifying information with respect to both the originating institution and the institution that is designated to receive said bundle.

100. The process of claim 98, wherein said data file received from said originating institution includes co-mingled financial instrument information intended for multiple receiving institutions.

101. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:
 a means for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;
 a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;
 an addressable media comprising a memory storage device where the bundled financial instrument information is uniquely accessible to the institution designated to receive the information;
 a means for storing said bundled financial instrument information in the addressable media where the bundled financial instrument information is uniquely accessible to the institution designated to receive the information;
 means for the institution designated to receive the information to transmit to and to receive from the means for storing; and
 a means for transmitting a bundle of said stored financial instrument information from the addressable storage media to the institution designated to receive the information upon the receipt of an instruction.

102. The apparatus of claim 101, further including a security mechanism for preventing the unauthorized one or more of the reception, transmission, translation and storage of financial instrument information.

103. The apparatus of claim 101, wherein said data file transmitted from said originating institution includes co-mingled financial instrument information intended for multiple receiving institutions.

104. A system for effecting one or more of the reception, transmission, translation and storage of data files between or among institutions, said data files containing co-mingled information about financial instruments, comprising:

a communication link between an originating institution and a master processor through which an electronic data file is sent from an originating institution, said data file being in a first file format established by the originating institution and containing identifying information with respect to both the originating institution and multiple institutions that are designated to receive different portions of the co-mingled financial instrument information;

said processor:
(a) validating the identifying information of the originating institution and the receiving institutions;
(b) authenticating the co-mingled financial instrument information contained in said data file in said first data format with respect to predetermined data format parameters;
(c) determining a preselected data file format acceptable to each receiving institution;
(d) separating said co-mingled financial instrument information into different bundles to be associated with a designated receiving institution; and
(e) translating each bundle of said separated financial instrument information into a data file format preselected by the receiving institution corresponding thereto;

a means for temporarily storing each bundle of said separated financial instrument information in a memory storage device in memory unique to the receiving institution associated therewith where each bundle of said financial instrument information is uniquely accessible to the institution designated to receive the information;

a communication link for transmitting each bundle of said separated financial instrument information stored in the memory storage device to the receiving institution associated therewith; and an archive for storing one of said co-mingled financial instrument information and said bundles of financial instrument information.

105. The system of claim 104, further including security procedures for preventing unauthorized reception, transmission, translation and storage of any financial instrument information within the system.

106. The system of claim 104, wherein said data file transmitted from said originating institution includes co-mingled financial instrument information intended for multiple receiving institutions.

107. A process for effecting one or more of the electronic reception, transmission, translation and storage of data files containing information relating to co-mingled financial instruments among multiple institutions, said financial instruments being exchanged between and among the institutions, comprising:

receiving a data file from an originating institution, said data file comprising co-mingled financial instrument information addressed to multiple receiving institutions being in a first file format established by the originating institution and containing a designation that specified information in the data file is to be received by a predetermined institution;

separating said co-mingled financial instrument information into one or more discrete bundles of information, each of which is associated with a predetermined institution specified as the recipient of the information:

translating each bundle of said separated financial instrument information in said first data file format into a data file format selected by the receiving institution associated therewith;

storing said bundled financial instrument information in a memory storage device in memory that is uniquely accessible to the institution specified as the recipient of the information; and transmitting said bundled financial instrument information in said second translated data file format to the institution that is to receive the information upon one of (a) demand from the institution that is to receive the information, (b) instructions by the originating institution and (c) within a prearranged time period.

108. The process of claim 107, wherein each separated bundle of financial instrument information contains identifying information with respect to both the originating institution and the institution that is designated to receive said bundle.

109. The process of claim 107, wherein said data file received from said originating institution includes co-mingled financial instrument information intended for multiple receiving institutions.

110. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:

a means for receiving a data file from an originating institution, said data file containing co-mingled records of a plurality of separate financial instruments, said data file being in a first file format established by the originating institution and containing a designation by the originating institution that information in the data file is to be received by more than one predetermined institution;

a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;

a means for storing said bundled financial instrument information in an addressable media where the bundled financial instrument information is uniquely accessible to the institution designated to receive the information;

means for the institution designated to receive the information to transmit to and to receive from the means for storing; and a means for transmitting a bundle of said stored financial instrument information from the addressable storage media to the institution designated to receive the information upon the receipt of an instruction.

111. The apparatus of claim 110, further including a security mechanism for preventing the unauthorized one or more of the reception, transmission, translation and storage of financial instrument information.

112. The apparatus of claim 110, wherein said data file transmitted from said originating institution includes co-mingled financial instrument information intended for multiple receiving institutions.

113. An electronic payment interchange concentrator for effecting one or more of the reception, transmission, translation and storage of electronic transaction data files, said files containing information relating to financial instruments, comprising at least two of (a) checks, (b) paper cash items, (c) money orders, (d) share orders, (e) drafts, and (f) electronic funds transfers, exchanged among multiple institutions, said financial instruments being exchanged between and among the institutions, comprising:

a means for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;

a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;

a means for storing said bundled financial instrument information in an addressable media where the bundled financial instrument information is uniquely accessible to the institution designated to receive the information;

means for the institution designated to receive the information to transmit to and to receive from the means for storing; and a means for transmitting a bundle of said stored financial instrument information from the addressable storage media to the institution designated to receive the information upon the receipt of an instruction.

114. The apparatus of claim 113, further including a security mechanism for preventing the unauthorized one or more of the reception, transmission, translation and storage of financial instrument information.

115. The apparatus of claim 113, wherein said data file transmitted from said originating institution includes co-mingled financial instrument information intended for multiple receiving institutions.

116. The apparatus of claim 113, wherein at least one of, (a) said first data file format and (b) the data file format selected by the predetermined institution, is Automated Clearing House format.

117. A system for effecting one or more of the reception, transmission, translation and storage of data files between or among institutions, said data files containing co-mingled information about financial instruments, comprising:

a communication link between an originating institution and a master processor through which an electronic data file is sent from an originating institution, said data file being in a first file format established by the originating institution and containing identifying information with respect to both the originating institution and multiple institutions that are designated to receive different portions of the co-mingled financial instrument information;

said processor:
(a) validating the identifying information of the originating institution and the receiving institutions;
(b) authenticating the co-mingled financial instrument information contained in said data file in said first data format with respect to predetermined data format parameters;
(c) determining a preselected data file format acceptable to each receiving institution;
(d) separating said co-mingled financial instrument information into different bundles to be associated with a designated receiving institution; and
(e) translating each bundle of said separated financial instrument information into a data file format preselected by the receiving institution corresponding thereto;

a means for temporarily storing each bundle of said separated financial instrument information in a memory storage device in memory unique to the receiving institution associated therewith;

a communication link for transmitting each bundle of said separated financial instrument information stored in the memory storage device to the receiving institution associated therewith; and an archive for storing one of said co-mingled financial instrument information and said bundles of financial instrument information;

wherein the financial instruments comprise at least two of checks, paper cash items, money orders, share orders, drafts, and electronic funds transfers.

118. The system of claim 117, further including security procedures for preventing unauthorized reception, transmission, translation and storage of any financial instrument information within the system.

119. The system of claim 117, wherein said data file transmitted from said originating institution includes co-mingled financial instrument information intended for multiple receiving institutions.

120. The system of claim 117, wherein at least one of, (a) said first data file format and (b) the preselected data format, is Automated Clearing House format.

121. A process for effecting one or more of the electronic reception, transmission, translation and storage of data files containing information relating to co-mingled financial instruments among multiple institutions, said financial instruments being exchanged between and among the institutions, comprising:

receiving a data file from an originating institution, said data file comprising co-mingled financial instrument information addressed to multiple receiving institutions being in a first file format established by the originating institution and containing a designation that specified information in the data file is to be received by a predetermined institution;

separating said co-mingled financial instrument information into one or more discrete bundles of information, each of which is associated with a predetermined institution specified as the recipient of the information:

translating each bundle of said separated financial instrument information in said first data file format into a data file format selected by the receiving institution associated therewith;

storing said bundled financial instrument information in a memory storage device in memory that is uniquely accessible to the institution specified as the recipient of the information; and transmitting said bundled financial instrument information in said second translated data file format to the institution that is to receive the information upon one of (a) demand from the institution that is to receive the information, (b) instructions by the originating institution and (c) within a prearranged time period;

wherein the financial instruments comprise at least two of checks, paper cash items, money orders, share orders, drafts and electronic funds transfers.

122. The process of claim 121, wherein each separated bundle of financial instrument information contains identifying information with respect to both the originating institution and the institution that is designated to receive said bundle.

123. The process of claim 121, wherein said data file received from said originating institution includes co-mingled financial instrument information intended for multiple receiving institutions.

124. The process of claim 121, wherein at least one of, (a) said first data file format and (b) the data file format selected by the receiving institution, is Automated Clearing House format.

125. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:

a common central facility comprising:

a means for receiving a data file from an originating institution, said data file containing co-mingled records of a plurality of separate financial instruments, said data file being a first file format established by the originating institution and containing a designation by the originating institution that information in the data file is to be received by one or more than one predetermined institution;

a processor for separating said co-mingled records of financial instrument information into separate bundles corresponding to each of the one or more predetermined institution designated by the originating institution to receive said records and for translating the records in each bundle of said financial instrument information records from said first data file format into a data file format selected by the predetermined institution designated to receive the information, said processor including program means for separating and bundling and for translating said records;

a means for storing said bundled financial instrument information in an addressable media where the bundled financial instrument information is uniquely accessible to the institution designated to receive the information;

means for the institution designated to receive the information to transmit to and to receive from the means for storing; and a means for transmitting a bundle of said stored financial instrument information from the addressable storage media to the institution designated to receive the information upon the receipt of an instruction.

126. The apparatus of claim 125, further including a security mechanism for preventing the unauthorized one or more of the reception, transmission, translation and storage of financial instrument information.

127. The apparatus of claim 125, wherein said data file transmitted from said originating institution includes co-mingled financial instrument information intended for multiple receiving institutions.

128. A system for effecting one or more of the reception, transmission, translation and storage of data files between or among institutions, said data files containing co-mingled information about financial instruments, comprising:

a communication link between an originating institution and a master processor, at a common central facility, through which an electronic data file is sent from an originating institution, said data file being in a first file format established by the originating institution and containing identifying information with respect to both the originating institution and multiple institutions that are designated to receive different portions of the co-mingled financial instrument information;

said processor:
(a) validating the identifying information of the originating institution and the receiving institutions;
(b) authenticating the co-mingled financial instrument information contained in said data file in said first data format with respect to predetermined data format parameters;
(c) determining a preselected data file format acceptable to each receiving institution;
(d) separating said co-mingled financial instrument information into different bundles to be associated with a designated receiving institution; and
(e) translating each bundle of said separated financial instrument information into a data file format preselected by the receiving institution corresponding thereto;

a means for temporarily storing each bundle of said separated financial instrument information in a memory storage device in memory unique to the receiving institution associated therewith;

a communication link for transmitting each bundle of said separating financial instrument information stored in the memory storage device to the receiving institution associated therewith; and an archive for storing one of said co-mingled financial instrument information and said bundles of financial instrument information.

129. The system of claim 128, further including security procedures for preventing unauthorized reception, transmission, translation and storage of any financial instrument information within the system.

130. The system of claim 128, wherein said data file transmitted from said originating institution includes co-mingled financial instrument information intended for multiple receiving institutions.

131. A process for effecting one or more of the electronic reception, transmission, translation and storage of data files containing information relating to co-mingled financial instruments among multiple institutions, said financial instruments being exchanged between and among the institutions, comprising:

receiving, at a common central facility, a data file from an originating institution, said data file comprising co-mingled financial instrument information addressed to multiple receiving institutions being in a first file format established by the originating institution and containing a designation that specified information in the data file is to be received by a predetermined institution;

separating, at the common central facility, said co-mingled financial instrument information into one or more discrete bundles of information, each of which is associated with a predetermined institution specified as the recipient of the information:

translating, at the common central facility, each bundle of said separated financial instrument information in said first data file format into a data file format selected by the receiving institution associated therewith;

storing, at the common central facility, said bundled financial instrument information in a memory storage device in memory that is uniquely accessible to the institution specified as the recipient of the information; and at the common central facility, transmitting, from the common central facility, said bundled financial instrument information in said second translated data file format to the institution that is to receive the information upon one of (a) demand from the institution that is to receive the information, (b) instructions by the originating institution and (c) within a prearranged time period.

132. The process of claim 131, wherein each separated bundle of financial instrument information contains identifying information with respect to both the originating institution and the institution that is designated to receive said bundle.

133. The process of claim 131, wherein said data file received from said originating institution includes co-mingled financial instrument information intended for multiple receiving institutions.

134. An electronic payment interchange concentrator for effecting one or more of the reception, transmission, translation and storage of electronic transaction data files, said files containing information relating to financial instruments exchanged among multiple institutions, said financial instruments being exchanged between and among the institutions, comprising:

a translator for receiving a data file from an originating institution, said data file containing co-mingled records of a plurality of separate financial instruments, said data file being in a first file format established by the originating institution and containing a designation by the originating institution that information in the data file is to be received by one or more than one predetermined institution;

the translator having a processor for separating said co-mingled records of financial instrument information into separate bundles corresponding to each of the one or more than one predetermined institution designated by the originating institution to receive said records and for translating the records in each bundle of said financial instrument information records from said first data file format into a data file format selected by the one or more than one predetermined institution designated to receive the information, said processor including program means for separating and bundling and for translating said records;

a memory storage mechanism for storing said bundled financial instrument information in an addressable media where the bundled financial instrument information is uniquely accessible to the one or more than one institution designated to receive the information;

a bi-directional communication link for the one or more than one institution designated to receive the information to transmit to and to receive from the memory storage mechanism; and a communication link for transmitting a bundle of said stored financial instrument information from the addressable media to the one or more than one institution designated to receive the information upon the receipt of an instruction.

135. The apparatus of claim 134, further including a security mechanism for preventing the unauthorized one or more of the reception, transmission, translation and storage of financial instrument information.

136. The apparatus of claim 134, wherein said data file transmitted from said originating institution includes co-mingled financial instrument information intended for multiple receiving institutions.

137. A system for effecting one or more of the reception, transmission, translation and storage of data files between or among institutions, said data files containing co-mingled information about financial instruments, comprising:

a communication link between an originating institution and a master processor through which an electronic data file is sent from an originating institution, said data file being in a first file format established by the originating institution and containing identifying information with respect to both the originating institution and multiple receiving institutions that are designated to receive different portions of the co-mingled financial instrument information;

said processor:

(a) validating the identifying information of the originating institution and the receiving institutions;

(b) authenticating the co-mingled financial information contained in said data file in said first data format with respect to predetermined data format parameters;

(c) determining a preselected data file format acceptable to each receiving institution;

(d) separating said co-mingled financial instrument information into different bundles to be associated with a designated receiving institution; and (e) translating each bundle of said separated financial instrument information into a data file format preselected by the receiving institution corresponding thereto;

a memory storage mechanism for temporarily storing each bundle of said separated financial instrument information in a memory storage device in memory unique to the receiving institution associated therewith;

a communication link for transmitting each bundle of said separated financial instrument information stored in the memory storage device to the receiving institution associated therewith; and an archive for storing one of said co-mingled financial instrument information and said bundles of financial instrument information.

138. The system of claim 137, further including security procedures for preventing unauthorized reception, transmission, translation and storage of any financial instrument information within the system.

139. The system of claim 137, wherein said data file transmitted from said originating institution includes co-mingled financial instrument information intended for multiple receiving institutions.

140. An electronic payment interchange concentrator for effecting one or more of the reception, transmission, transla-

*tion and storage of electronic transaction data files, said files containing information relating to financial instruments exchanged among multiple institutions, said financial instruments being exchanged between and among the institutions, comprising:*

*a means for receiving a data file from an originating institution, said data file containing co-mingled records of a plurality of separate financial instruments, said data file being in a first file format established by the originating institution and containing a designation by the originating institution that information in the data file is to be received by more than one predetermined institution;*

*a processor for separating said co-mingled records of financial instrument information into separate bundles corresponding to each of the more than one predetermined institution designated by the originating institution to receive said records and for translating the records in each bundle of said financial instrument information records from said first data file format into a data file format selected by the predetermined institution designated to receive the information, said processor including program means for separating and bundling and for translating said records;*

*a means for storing said bundled financial instrument information in an addressable media where the bundled financial instrument information is uniquely accessible to the institution designated to receive the information;*

*means for the institution designated to receive the information to transmit to and to receive from the means for storing; and*

*a means for transmitting a bundle of said stored financial instrument information from the addressable storage media to the institution designated to receive the information upon the receipt of a demand from the institution that is to receive the information.*

*141. The electronic payment interchange concentrator of claim 113, wherein one of the at least two of (a) checks, (b) paper cash items, (c) money orders, (d) share orders, (e) drafts, and (f) electronic funds transfers, comprises electronic funds transfers.*

\* \* \* \* \*